(12) United States Patent
Burroughs

(10) Patent No.: US 6,925,218 B2
(45) Date of Patent: Aug. 2, 2005

(54) CONTROL TECHNIQUES AND DEVICES FOR AN OPTICAL SWITCH ARRAY

(75) Inventor: Alan C. Burroughs, San Jose, CA (US)

(73) Assignee: Vitesse Semiconductor Corporation, Camarillo, CA (US)

(*) Notice: Subject to any disclaimer, the term of this patent is extended or adjusted under 35 U.S.C. 154(b) by 0 days.

(21) Appl. No.: 10/150,531

(22) Filed: May 17, 2002

(65) Prior Publication Data

US 2002/0186918 A1 Dec. 12, 2002

Related U.S. Application Data

(63) Continuation-in-part of application No. 09/715,847, filed on Nov. 17, 2000, now Pat. No. 6,580,846.
(60) Provisional application No. 60/291,851, filed on May 17, 2001, provisional application No. 60/207,643, filed on May 26, 2000, provisional application No. 60/209,915, filed on Jun. 6, 2000, provisional application No. 60/211,693, filed on Jun. 14, 2000, and provisional application No. 60/241,727, filed on Oct. 18, 2000.

(51) Int. Cl.[7] .............................................. G02B 6/26
(52) U.S. Cl. ........................... 385/16; 385/17; 385/18; 385/19; 385/20; 385/24; 385/12; 385/13; 356/153; 356/154; 356/155; 356/156

(58) Field of Search .............................. 385/16, 17, 18, 385/19, 20, 24, 12, 13, 89, 90; 356/153–156

(56) References Cited

U.S. PATENT DOCUMENTS

| | | | |
|---|---|---|---|
| 4,365,863 A | 12/1982 | Broussaud | |
| 5,524,153 A | 6/1996 | Laor | |
| 6,097,858 A | 8/2000 | Laor | |
| 6,210,401 B1 | 4/2001 | Lai et al. | |
| 6,344,912 B1 | 2/2002 | Hajjar et al. | |
| 6,483,962 B1 * | 11/2002 | Novotny | 385/18 |

FOREIGN PATENT DOCUMENTS

JP          05-107485          4/1993

* cited by examiner

*Primary Examiner*—Tarifur R. Chowdhury
*Assistant Examiner*—George Y. Wang
(74) *Attorney, Agent, or Firm*—Fish & Richardson P.C.

(57) ABSTRACT

Techniques and systems for controlling an optical switch array based on local and global optical monitoring and feedback controls. Each optical switch element includes a local optical monitoring mechanism to form a local feedback control to lock the switch element at a desired orientation. The global optical monitoring is used to adjust at least one switch element in the path of the signal beam to maintain an overall alignment.

11 Claims, 21 Drawing Sheets

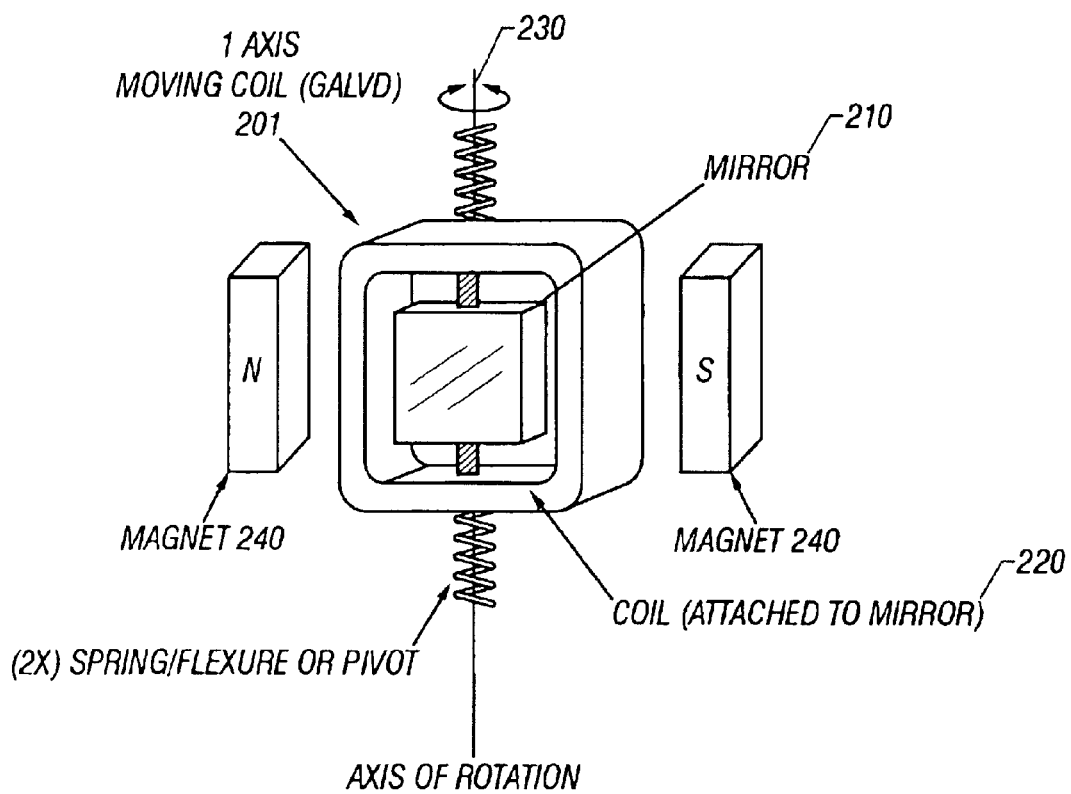
FIG. 2A
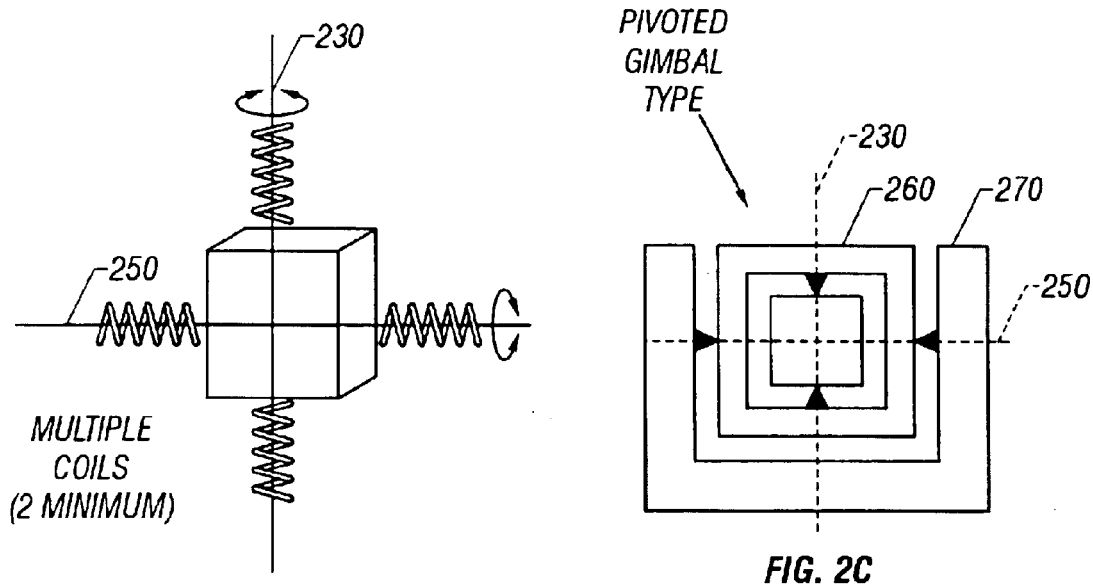
FIG. 2B
FIG. 2C

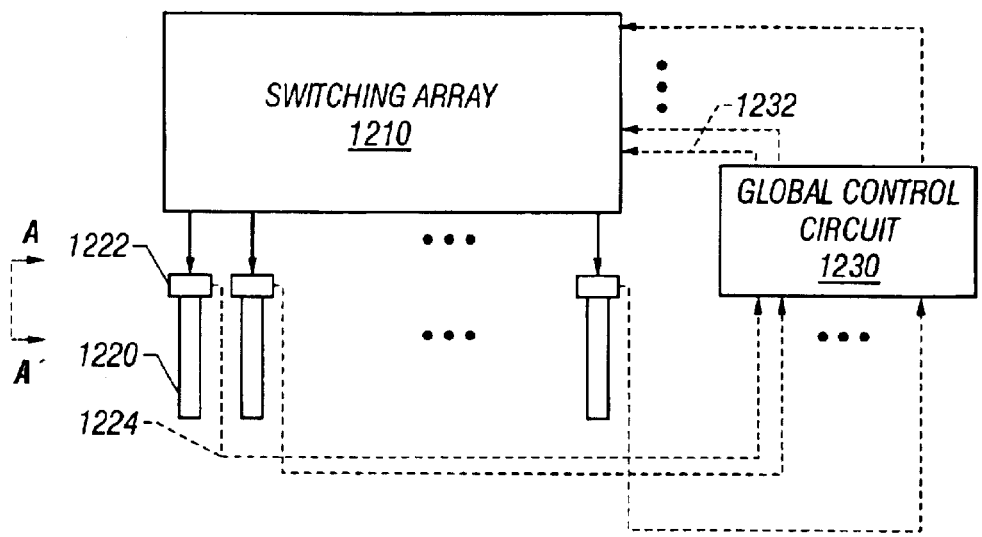
FIG. 12
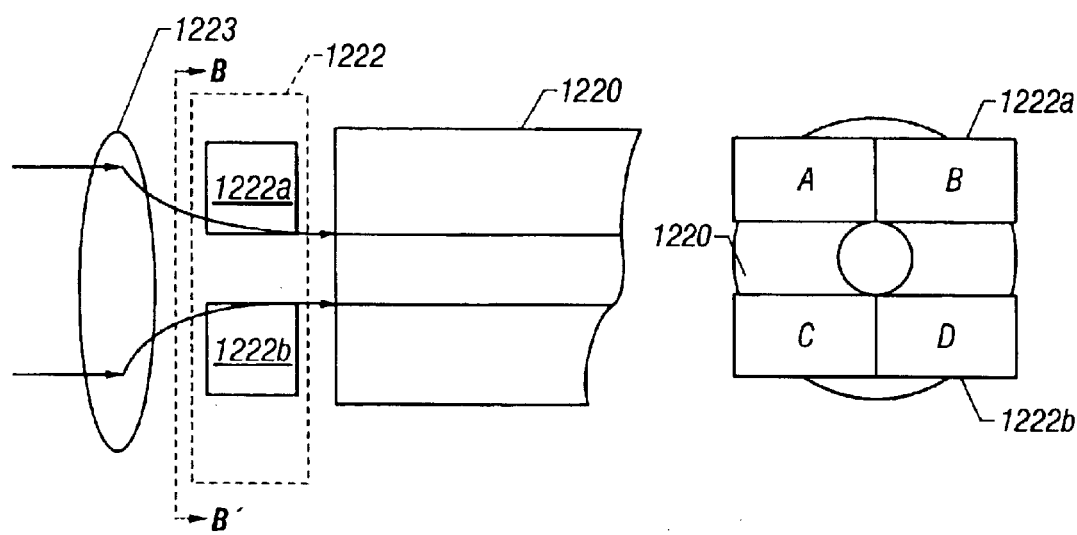
FIG. 12A  FIG. 12B

Galvo Seek Trajectory to Move Beam From Fiber-to-Fiber

PULSE WIDTH MODULATION OF GALVO LASER

CONTROL TECHNIQUES AND DEVICES FOR AN OPTICAL SWITCH ARRAY

This application claims the benefit of U.S. Provisional Application No. 60/291,851 filed May 17, 2001 and is a continuation-in-part of U.S. application Ser. No. 09/715,847 filed Nov. 17, 2000 now U.S. Pat. No. 6,580,846. The U.S. application Ser. No. 09/715,847 further claims the benefits of U.S. Provisional Application No. 60/207,643, filed May 26, 2000, Ser. No. 60/209,915, filed Jun. 6, 2000, Ser, No. 60/211,693, filed Jun. 14, 2000, and Ser. No. 60/241,727, filed Oct. 18, 2000.

BACKGROUND

This application relates to optical switches, and more particularly, to optical switches for various optical devices and systems, including optical communication and networking devices and systems.

An optical switch may include a device to direct at least one optical beam from one direction of propagation to another direction of propagation. One or more such optical switches may be used in various optical communication modules or systems to route optical signal beams to their respective destinations. One exemplary application of optical switches is to reconfigure light paths to form new light paths when needed. In another example, such a switch may be used to perform protection switching in which, when a fiber link fails, the beam directed thereto is re-routed to a backup fiber link. Optical switching is important in optical WDM modules and systems since a single fiber link is used to simultaneously transmit optical carriers of different wavelengths to accommodate a large number of optical channels.

Multiple optical switches may be used to form a switching array to switch and direct an array of input optical beams to their respective outputs. Such an optical switching array may be designed to perform blocking switching and non-blocking switching. In a blocking switching array, when a first beam is directed to a selected output, another beam can be switched to only certain outputs and are blocked from reaching other outputs. In a non-blocking switching array, any input beam can be switched to reach any output. It is desirable to use non-blocking switching arrays to provide flexibility and versatility in directing optical beams in optical WDM communication systems and other optical systems that implement optical switching from multiple inputs to multiple outputs.

SUMMARY

This application includes techniques and modules for controlling optical switches. In one embodiment, each optical switch includes a switching element, an optical position sensor, and a control unit. The switching element is operable to direct an optical signal beam to one or more switching directions. The optical position sensor uses an optical servo beam to measure a property of the switching element to produce a position signal indicative of a deviation between an actual switching direction and a desired switching direction of the signal beam. The control unit is operable to respond to the position signal to control the switching element to reduce the deviation so that the signal beam can be substantially in the desired switching direction.

The optical switch may also include an optical terminal having an optical aperture to receive the signal beam directed from the switching element, and another optical position sensor coupled to the optical terminal to measure a position of the signal beam on the optical aperture to produce a second position signal. The switching element may be operable to respond to the second position signal to further control the actual switching direction of the signal beam so that the signal beam is directed to a desired position on the optical aperture.

In one embodiment, an optical switch system include an array of input optical ports each operable to receive a signal beam, an array of first optical switch elements, an array of second optical switch elements, an array of output optical ports, a plurality of output optical detectors, and a switch control module. The array of first optical switch elements is positioned to respectively receive light from said input optical ports. Each first optical switch element comprises a first front reflector to receive and reflect said signal beam, a first back reflector fixed in position relative to said first front reflector to reflect a first local servo beam, a first optical position sensor to receive said first local servo beam and to produce a first position signal indicative of an orientation of said first front reflector, and a first actuator engaged to control an orientation of said first front reflector in response to said first position signal.

The array of second optical switch elements is positioned to receive light from said first optical switch elements. Each second optical switch element is operable to receive and reflect said signal beam reflected from any first optical switch element. More specifically, each second optical switch element includes a second front reflector to receive and reflect said signal beam, a second back reflector fixed in position relative to said second front reflector to reflect a second local servo beam, a second optical position sensor to receive said second local servo beam and to produce a second position signal indicative of an orientation of said second front reflector, and a second actuator engaged to control an orientation of said second front reflector in response to said second position signal.

The array of output optical ports is positioned to respectively receive light from said second optical switch elements, said signal beam reflected from said second optical switch element at one output optical port. The output optical detectors are respectively coupled to said array of output optical ports. Each output optical detector is operable to receive a fraction of output optical power of a corresponding output optical port to produce an output detector signal having information about an alignment of incident light at said corresponding output optical port. The switch control module is coupled to receive output detector signals from said array of output optical detectors and to communicate with said first and said second optical switch elements. The switch control module is responsive to a respective output detector signal and respective first and said second position signals to control orientations of respective first and second actuators in switching said signal beam from one input optical port to one output optical port.

In another aspect, a method is provided to control and operate an optical switching array with a plurality of optical switch elements to direct a signal beam. In one embodiment, a local servo control loop is provided to actively control an orientation of each optical switch element in said optical switch array. The active control includes: optically measuring an orientation of each optical switch element by an optical position sensor in the local servo control loop, using the measured orientation to determine an error in orientation with respect to a desired orientation, and adjusting the optical switch element to reduce said error.

The method further provides optically measuring an overall alignment of said signal beam that is directed by at least two different optical switch elements in said optical switch array, and that, at least one of said two different optical switch elements in an optical path of said signal beam is adjusted to reduce an error in said overall alignment.

BRIEF DESCRIPTION OF DRAWINGS

FIGS. 2A, 2B, and 2C show examples of 1D and 2D actuators based on galvanometers.

FIGS. 12, 12A, 12B, 13, 14, 14A, 14B, and 15 show exemplary switching systems that use designated global optical servo beams to implement the global optical position sensing.

DETAILED DESCRIPTION

Optical switch designs and switching techniques of the present application include optical switching arrays having adjustable reflectors that are coupled to their respective positioning actuators and are actively controllable to direct optical beams in free space. For example, multiple optical beams from one set of input terminals such as input fibers may be directed to a set of receiving terminals such as output fibers through one or more optical switching arrays. A local optical position sensing mechanism can be implemented to monitor any deviation in the orientation of each individual reflector from a desired orientation at which an optical beam directed by that reflector is properly aligned. A servo optical beam may be used to monitor and measure the orientation of each reflector. This servo optical beam may be a separate beam that does not carry communication data and is independent of the signal beam to be switched by the reflector.

Such a local servo control mechanism may be built in each reflector to control the actuator for each reflector, in response to a corresponding deviation indicator signal from the local optical sensor, to compensate for positioning errors in each reflector. In addition, a global optical sensing mechanism may be used to monitor and measure the overall alignment of a signal beam from a switching array, of which the local reflector is one switching element, to provide a fine positioning information for the switching elements involved in directing that signal beam so that one or more of those switching elements may be adjusted to finely align the signal beam.

Each switching array may be designed to use at least two different switching elements to direct any optical beam received from an input terminal, e.g., an input fiber port, to reach a desired output terminal. This arrangement, in combination of the local servo, the global servo, or both, can be used to achieve reliable and accurate optical alignment in each switching operation.

Figure 1A:
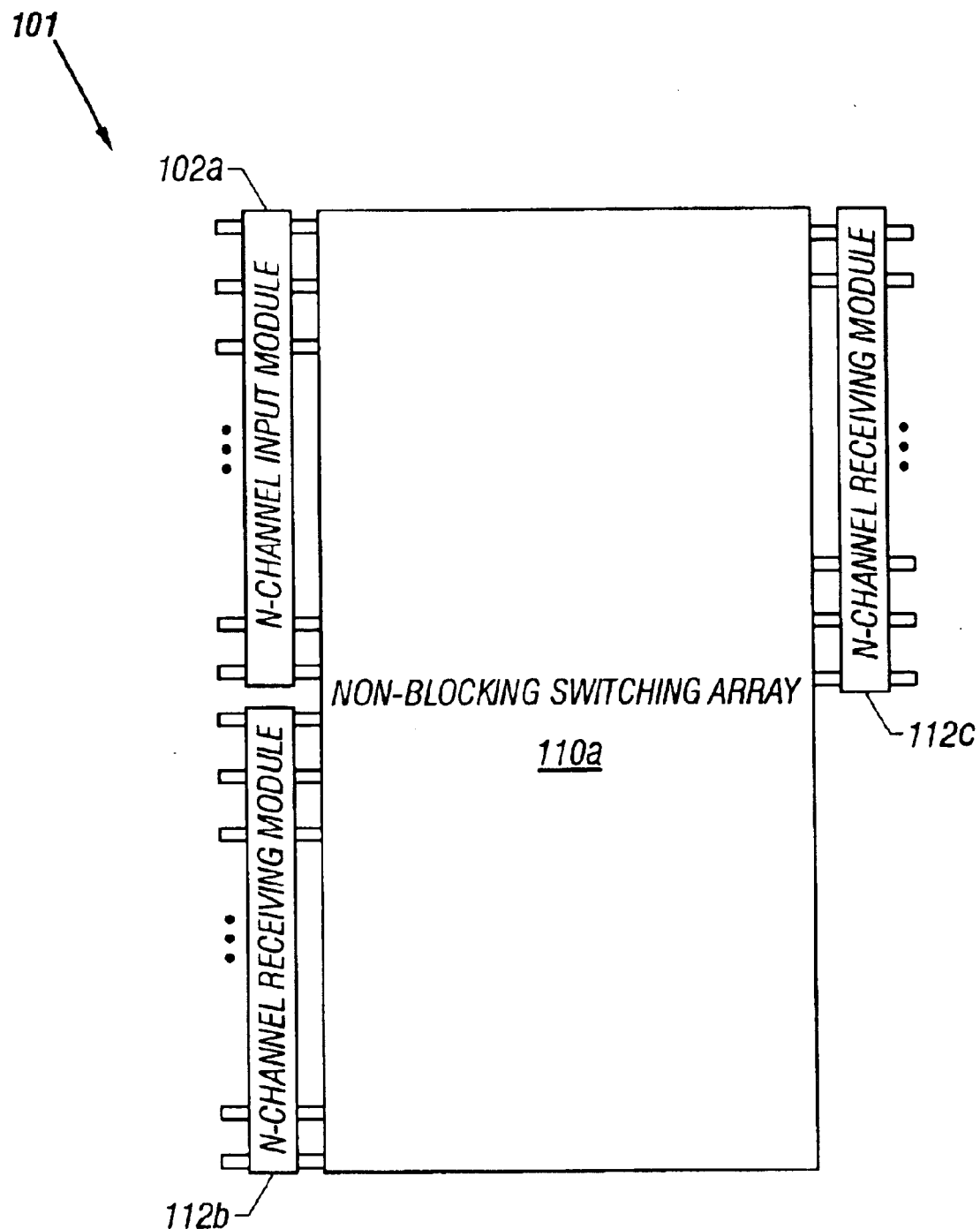
FIGS. 1A, 1B, and 1C show exemplary non-blocking switching arrays and respective arrangements in their input and output fiber modules.
Figure 1B:
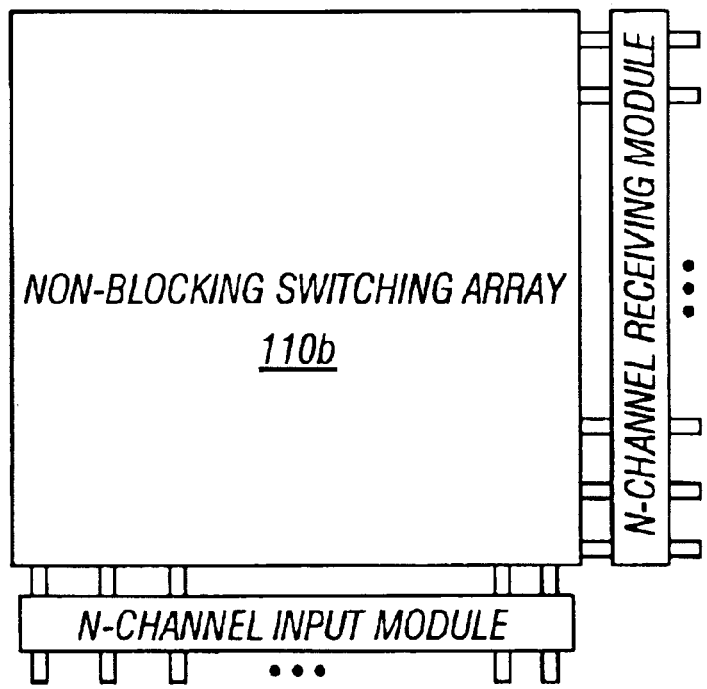
Figure 1C:
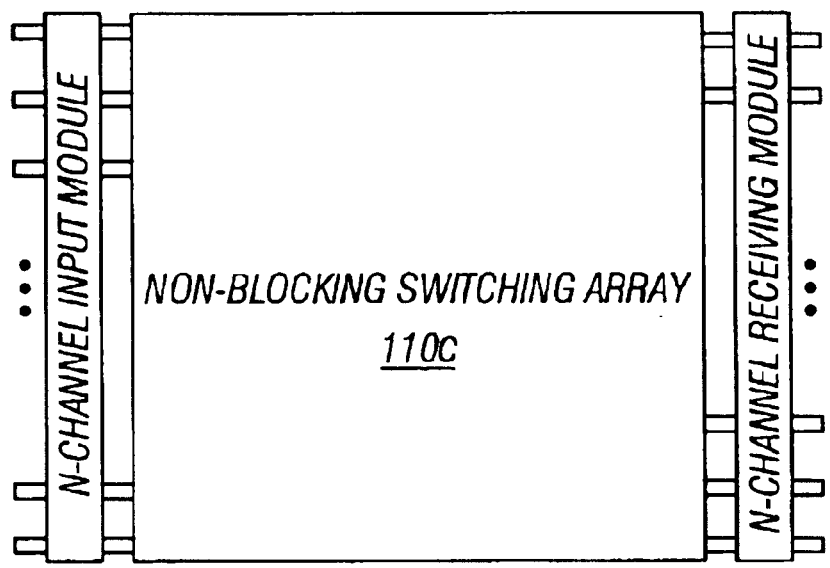

Such controllable switches may be generally used to form either blocking or non-blocking switching arrays. FIGS. 1A, 1B, and 1C illustrate three different exemplary configurations 101, 102, and 103 for arranging input and output terminals that are coupled to a non-blocking switching array.

In FIG. 1A, a non-blocking switching array 110a is arranged to allow a N-channel input module 112a with N input optical terminals and another N-channel receiving module 112b with N receiving terminals to locate side by side on one side of the switching array 110a. An input terminal may be a number of devices, such as a signal laser or an input fiber. An output terminal may be a photodetector or an output fiber. Input fibers coupled to the input module 112a and output fibers coupled to the output module 112b may be substantially parallel so that the entire switch 101 can be conveniently inserted into a slot of a control rack that has slots to mount other optical or electronic modules for an optical fiber communication system. In a non-blocking design, any input optical channel received by the input module 112a may be switched to any output terminal in the receiving module 112b.

Each of the input and receiving modules 112a and 112b may also be bi-directional to operate both as input and output optical channels. Furthermore, at least another input or output N-channel module 112c may be coupled to the switching array 110a so that any input from the module 112a may be switched to any output of the module 112c.

FIGS. 1B and 1C show alternative configurations 102 and 103 with non-blocking switching arrays 110b and 110c, respectively. The input fibers and the output fibers are arranged in a 90-degree configuration in FIG. 1B and are placed in two opposing sides of the switching array 110c in FIG. 1C.

Any of the above switching arrays generally includes multiple switching elements, each of which may include an adjustable reflector for re-directing an optical beam. A positioning actuator may be coupled to the reflector to control the orientation of the reflector in at least two ways. First, the actuator can set the reflector at two or more predetermined orientations for switching operations. Secondly, the actuator is operable to adjust the reflector around each predetermined orientation to optimize the alignment of the optical beam directed thereby.

Actuators for the reflectors may be one-dimensional (1D) actuators that are operable to rotate their respective reflectors around a single rotation axis, or two-dimensional (2D) actuators that are operable to rotate their respective reflectors with respect to two different rotation axes (e.g., two orthogonal axes). Such 1D or 2D actuators may be implemented in a variety of configurations, including galvanometer actuators and micro-electro-mechanical systems (MEMS) fabricated on semiconductor wafers.

FIGS. 2A, 2B, and 2C illustrate exemplary 1D and 2D galvanometer actuators that may be used in optical switches. A galvanometer operates based on a magnetic force between a conductive coil carrying an electric current and a magnet assembly. FIG. 2A shows an example of a 1D galvanometer actuator 201 in which a reflector 210 is affixed to a coil 220. The coil-reflector assembly is mounted to a spring, a resilient flexure, or pivot to rotate around a single axis 230. A magnetic assembly 240 is used to generate a proper magnetic field pattern at the coil 220 to cause the rotation. The direction and the magnitude of the electric current in the coil 220 can be adjusted to control the orientation of the coil-reflector assembly.

FIGS. 2B and 2C show two exemplary configurations for 2D galvanometer actuators. At least two independent coils are used to respectively cause rotations around two orthogonal rotation axes 230 and 250. The design in FIG. 2B uses a spring or flexure mechanism to implement each of the two rotation axes. The design in FIG. 2C uses a pivoted gimbal configuration in which the coil-reflector assembly is suspended in a frame 260 to rotate around the first axis 260 and the frame 260 is suspended in another frame 270 to rotate around the second axis 250.

A switching array, such as the switching arrays 101, 102, and 103 shown in FIGS. 1A, 1B, and 1C, may be designed to provide two or more switching elements in each optical path within the switching array to allow for a sufficient number of degrees of freedom in adjusting the direction of each signal beam. For example, the direction of a signal beam directed to a receiving optical terminal in a switching array may be adjusted in at least four different degrees of freedom at the receiving optical aperture of the terminal, such as the input fiber facet of a receiving fiber or photodetector.

Figure 3:
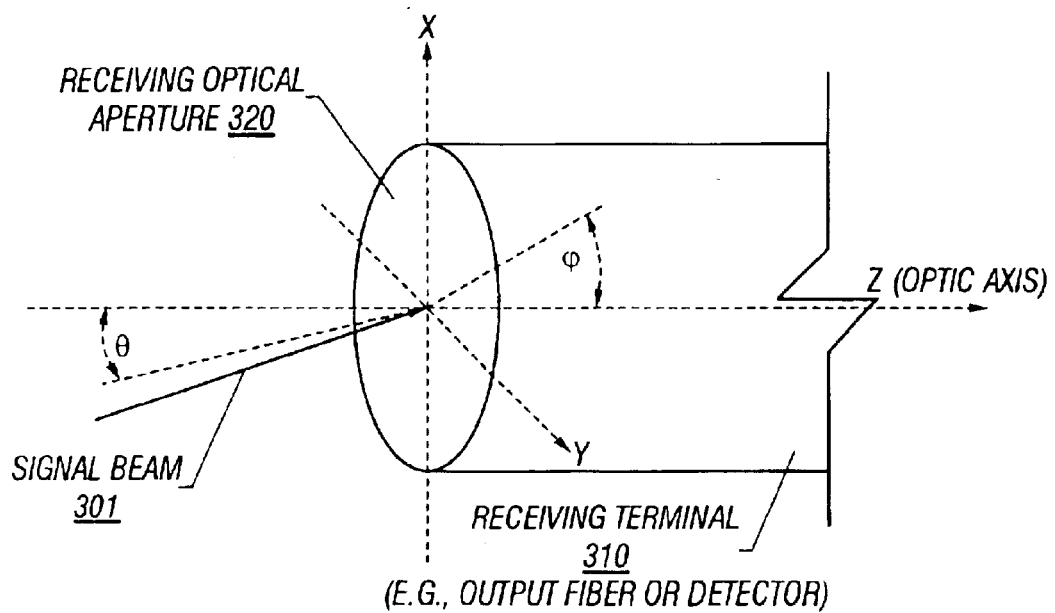
FIG. 3 illustrates degrees of freedom in directing a signal beam into a receiving optical terminal.

FIG. 3 shows the four degrees of freedom in alignment of a signal beam 301 incident to a receiving optical aperture 320 of a receiving terminal 310 in a switching array. There are two degrees of freedom in translational adjustments along two orthogonal directions x and y on the optical aperture 320 in the xy plane. The other two degrees of freedom are angular adjustments in the azimuth angle θ in the yz plane around the x axis as azimuth rotation axis and an elevation angle φ in the vertical xz plane around the y axis as the elevation axis. All terminals in the input and receiving modules 401 and 402 are located within the yz plane. A switching array may be arranged to have at least four separate 1D reflectors in each optical path, or a combination of at least one 2D reflector and two 1D reflectors, or a combination of at least two 2D reflectors.

Figure 4:
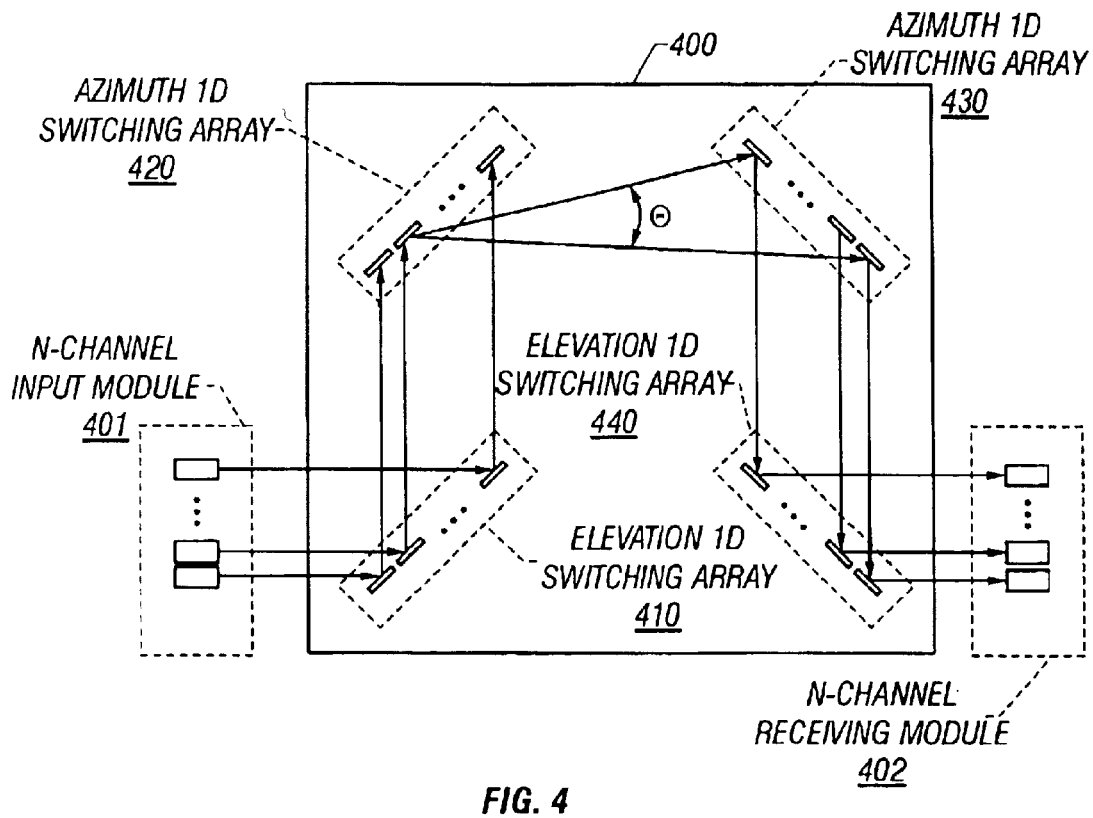
FIGS. 4, 5, and 6 show three examples of non-blocking switching arrays.

FIG. 4 illustrates an exemplary switching array 400 based on 1D actuators in all reflectors in a non-blocking configuration. An input module 401 and a receiving module 402 with the same number (N) of terminals are coupled to the switching array 400. The switching array 400 includes 4N switching elements with 1D actuators that are arranged in 4 linear switching arrays 410, 420, 430, and 440 each with N switching elements. Two reflectors within the same linear switching array do not receive a signal beam from or send a signal beam to each other. Each signal beam is reflected four times by four different reflectors respectively in the four linear switching arrays 410 through 440 to provide the four degrees of freedom in alignment.

Two linear switching arrays, 410 and 4430, are positioned to respectively receive input signals from the input module 401 and to send the switched signals to the receiving module 402. One switching element in each of the arrays 410 or 440 only receives a signal beam from or sends a signal beam to a designated terminal in the input module 401 or the receiving module 402 as illustrated. In addition, each switching element in the array 410 only receives a signal beam from or sends a signal beam to a designated switching element in the array 420. Similarly, each switching element in the array 440 only receives a signal beam from or sends a signal beam to a designated switching element in the array 430. Furthermore, each 1D switching in the arrays 410 and 440 can change the direction of a signal beam in the elevation direction as defined in FIG. 3.

The linear switching arrays 420 and 430 are formed of 1D switching elements that change the directions of their respective signals beams in the azimuth direction as defined in FIG. 3. In particular, the arrays 420 and 430 are positioned relative to each other to allow any reflector in one of the arrays 420 and 430 to receive a signal beam from or send a beam from to any one of N switching elements in the other array. Hence, for a given angular scanning range Θ for each reflector, the linear switching arrays 420 and 430 should be spaced and positioned so that each switching element in one linear switching array is within the field of view of each switching element of another adjacent linear switching array, such as adjacent arrays 410 and 420, and adjacent arrays 420 and 430. Therefore, the linear switching arrays 420 and 430 are used to perform the actual switching operations in the system 400. All four 1D arrays 410 through 440, however, are used to align the signal beams.

Figure 5:
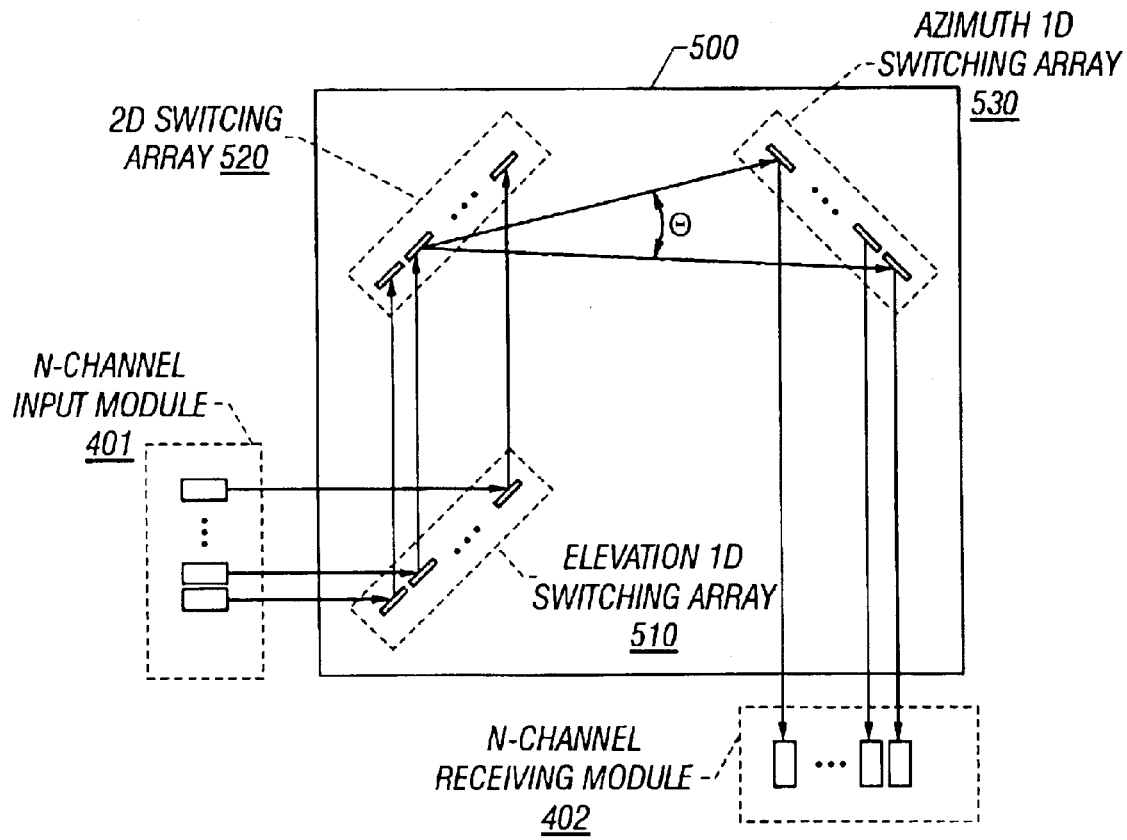
Figure 6:
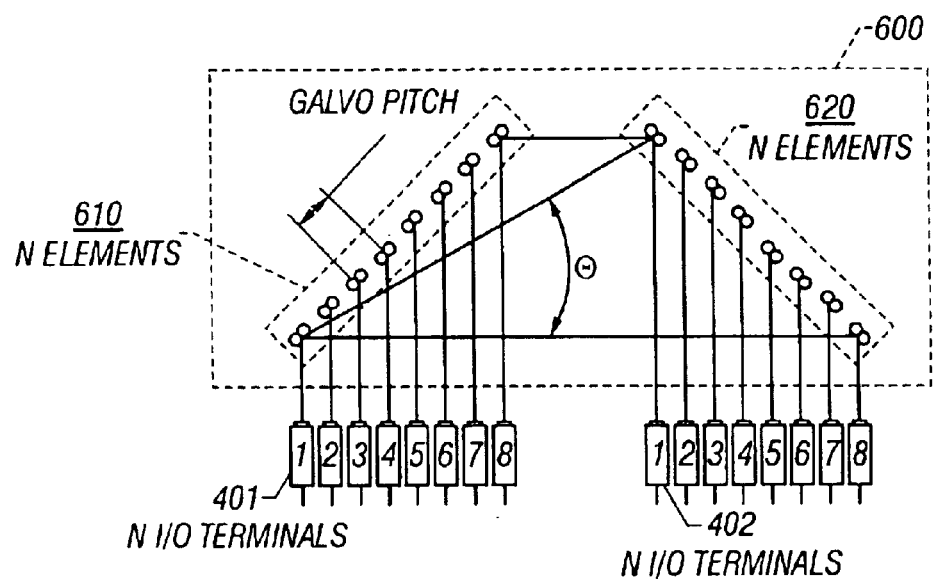

FIG. 5 shows another non-blocking switching array 500 with three linear switching arrays 510, 520, and 530, two of which, e.g., 510 and 520, have 1D reflectors in two orthogonal directions, and one of which, e.g., 530 has 2D reflectors. FIG. 6 shows yet a third example of a non-blocking switching array 600 having two 2D N-element linear switching arrays 610 and 620 so that each beam is reflected only twice by two different 2D switching elements. Hence, using 2D reflectors can reduce the number of switching elements needed. In addition, using 2D reflectors can improve the alignment tolerance for a given size of the receiving optical aperture in each switching element. For example, any alignment error caused by a small angular error may be amplified in displacement by the total traveling distance of each beam for using 1D linear switching arrays.

The switching arrays 400, 500, and 600 may operate bi-directionally to switch channels from the I/O module 401 to the I/O module 402 or vice versa.

Figure 6A:
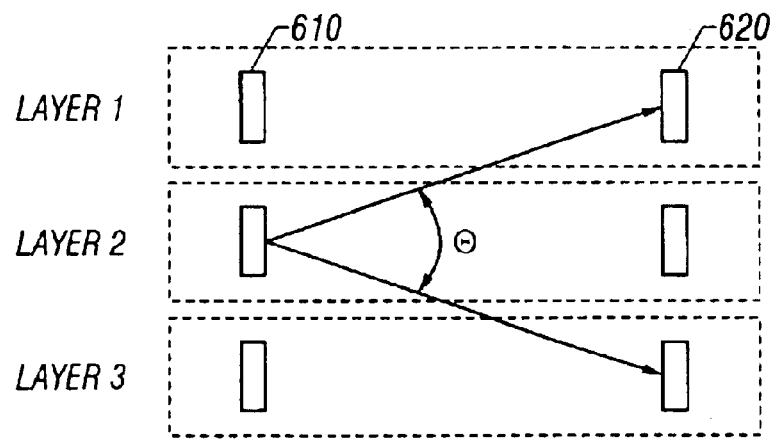
FIGS. 6A and 6B show examples of switching arrays with two or more layers of input and output fiber modules.

In the switching array 600 in FIG. 6, the I/O terminals of the I/O modules 401, 402 and the 2D switching elements may be placed substantially in the same plane to form an N×N switch layer. Two or more such layers may be stacked together in parallel to form a (MN)×(MN) switch network where M is the number of stacked layers. Similar to the requirement within each layer, the number of layers, M, is limited to the field of view of each switching element as illustrated in FIG. 6A (M=3) to allow any input from any layer to any output in the same layer or any other layer.

Figure 6B:
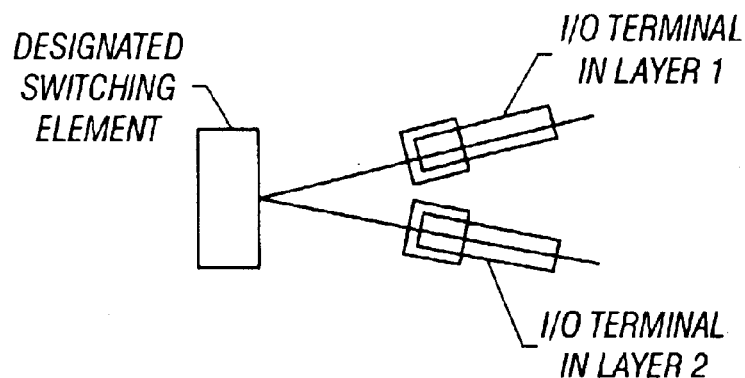

Alternatively, a single switching array 600 may be used to form an N×(MN) switch network when M layers of I/O modules 401, 402 are stacked in a non-parallel configuration so that fiber terminals at the same position in different layers can optically communicate with a designated switching element in the corresponding designated linear switching array. FIG. 6B illustrates an example of an N×(2N) switching network. The optic axis of the two terminals form an acute angle and intercept at or near the reflector of their designated switching element. When the designated switching element is oriented to direct a beam from one angled terminal to another linear array, the beam from the other angled terminal cannot be directed and hence is blocked. A receiving switching element in the other linear switching array, however, can direct the received beam to any one of the two corresponding angled terminals. Hence, the switching network is either a N-to-MN switch or a MN-to-N switch.

It is recognized that an adjustable reflector may have errors in its orientation. Such position errors may be caused by various factors, including but not limited to a change in the operating environmental parameters (temperature, humidity, vibrations, etc.), the inherent design, or aging of the combination of each reflector and the respective actuator. Hence, it may be desirable to implement a local optical position sensor in each reflector and a control unit to control the actuator to correct the error based on the error measurement obtained from the position sensor.

A local position sensing mechanism for each individual reflector may use a designated optical servo beam to sense the orientation of each reflector. Such a servo optical beam may be independent from a signal beam to be redirected by the reflector and have a completely different optical path from the signal beam. The servo optical beam may have a servo wavelength different from that of the signal beam so that the switching array is a "dual-color" or dichroic optical system.

Figure 7A:
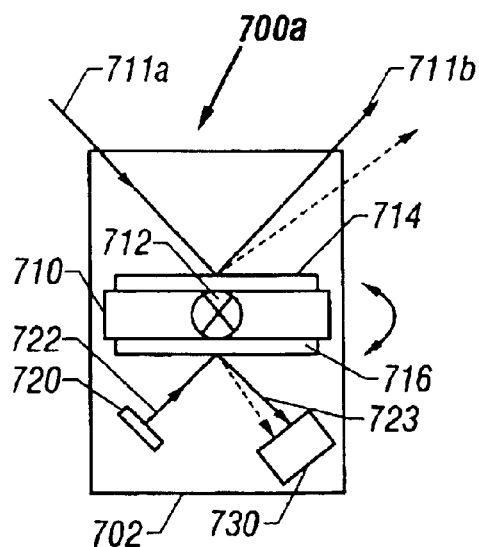
FIGS. 7A, 7B, 8, 9, 9A, 9B, 10, and 11 show exemplary local optical position sensing systems that monitor and control individual switching elements at their preset orientations.
Figure 7B:
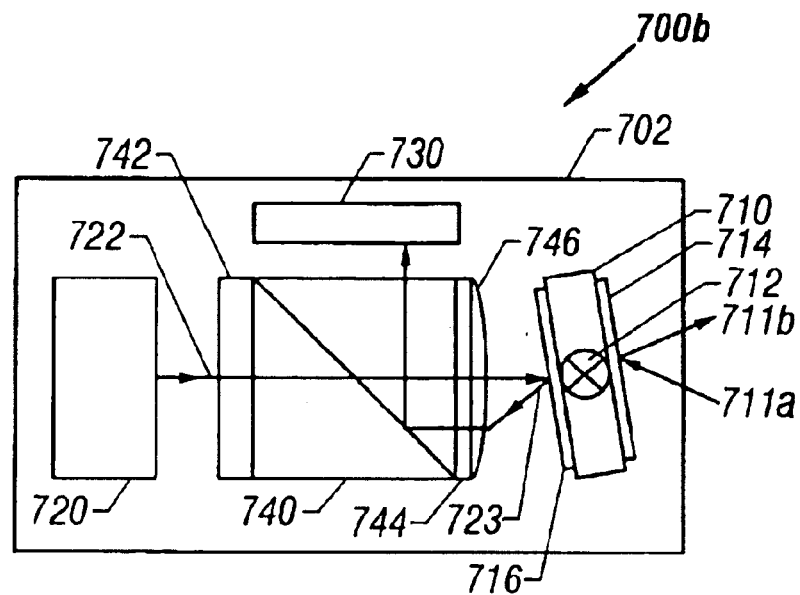

FIGS. 7A and 7B show two different examples of suitable local optical position sensors for individual reflectors. FIG. 7A illustrates a switching element 700a which has a reflector 710 and an actuator 712 (e.g., a galvanometer) for controlling the reflector 710. A base 702 is used to support both the actuator 712 and the reflector 710. The actuator 712 may be operable to rotate the reflector 710 with respect to a single rotation axis or two orthogonal rotation axes. The reflector 710 has a reflective surface 714 to direct an input signal beam 711a to another direction along 711b. In general, the actuator 712 is operable to set two or more predetermined reflector orientations for switching. When the reflector 710 directs the input signal beam 711a to a direction 711c that deviates from a desired predetermined direction 711b, the actuator 712 can be adjusted to correct the deviation and hence to adjust the reflected beam back to the proper direction 711b. Such operation is possible when the orientation of the reflector 710 can be monitored by measuring a direction change in a reflection of an optical servo beam 722 to detect the deviation.

The reflector 710 is designed to include a second reflective surface 716 that may be on the opposite side of the first reflective surface 714. A light source 720 and a position-sensing photodetector 730 are mounted on the base 702 to generate the servo beam 722 and to detect a position of the reflected servo beam 723, respectively. A LED or a diode laser may be used as the light source 720. The photodetector 730, which can be used in other embodiments of this disclosure, may include a sensing surface operable to determine a position of the reflected monitor beam 723. For example, a detector with an array of discrete photosensing areas or pixels such as CCDs or quad detectors may be used. In addition, a semiconductor position sensitive detector with a PIN photodiode may be used. The PIN photodiode may include one or two uniform, resistive surfaces to provide continuous position data of a beam. The relative positions of the reflector 710, the light source 720, and the detector 730 are arranged and calibrated so that the positions of the reflected servo beam 723 on the detector 730 can be used to measure the orientations of the reflector 710. This information is then used to generate a control signal to control the orientation of the actuator 712 by, e.g., changing the driving current to a respective coil if the actuator 712 is a galvanometer actuator.

FIG. 7B shows a switch 700b with an alternative optical sensing mechanism. A polarization beam splitter (PBS) 740, a a quarter wave plate 744, and a lens 746 are used to guide the incident polarized servo beam 722 and the reflected servo beam 723. The servo beam 722 is linearly polarized upon entering the PBS 740 so that it transmits through the PBS 740. An optical element 742 may be placed between the light source 720 and the PBS 740 to modify the output beam from the light source 720 so that the beam is linearly polarized along a proper direction and is well collimated. The lens 746 then images the servo beam 722 onto the second reflective surface 716 of the reflector 710. The reflected servo beam 723 passes through the lens 746 and the rotator 744 for the second time so that its polarization is rotated by 90 degrees with respect to the original polarization. The PBS 740 then directs the reflected servo beam 723 to the photodetector 730 by reflection.

Figure 8:
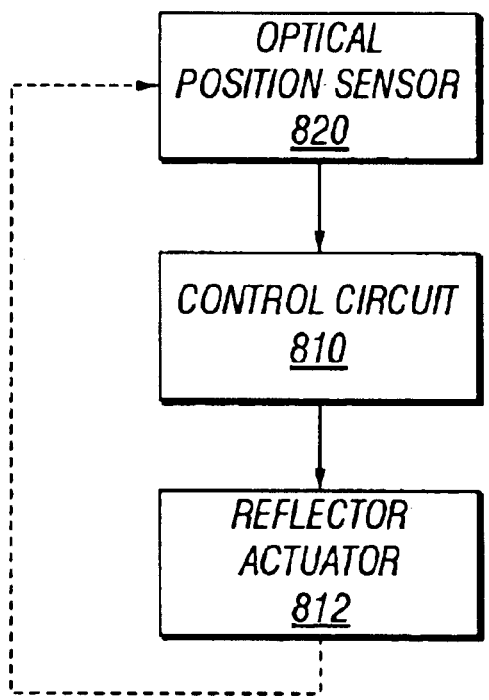

A control circuit 810 is generally implemented to control the actuator 712 in response to the position error signal from the position-sensing photodetector 730. FIG. 8 shows one embodiment of the active control mechanism in a switching array. An optical position sensor 820 as illustrated in the examples in FIGS. 7A and 7B and other implementations is used to monitor and measure the alignment error in the reflector 710. The control circuit 810 responds to the position error signal from the optical position sensor 820 to produce a control feedback signal to the respective one reflector actuator 812 (e.g., a galvanometer). The actuator 812 then adjusts the orientation of its reflector to reduce the error associated with that reflector.

Figure 9:
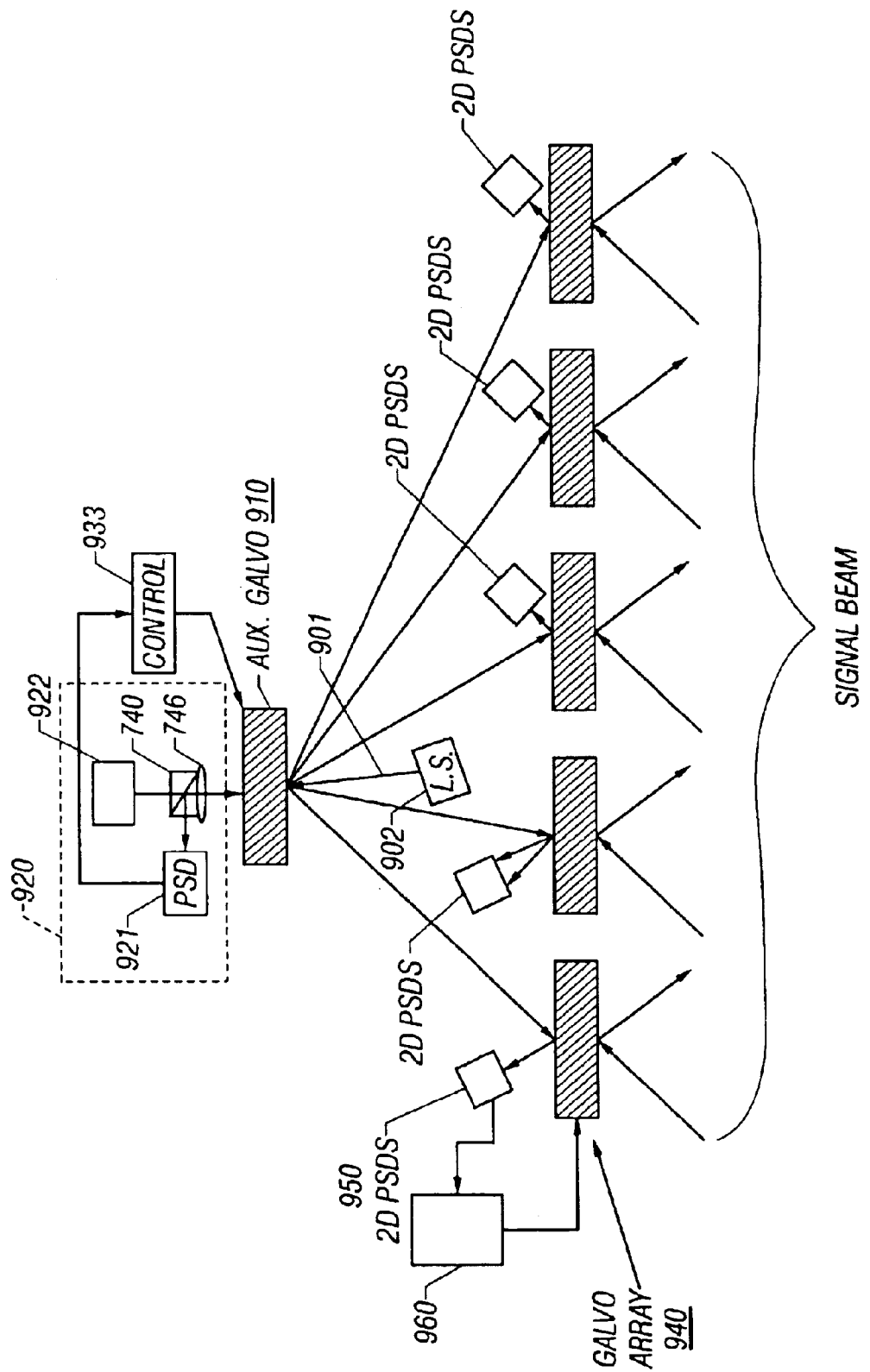

The above use of an independent servo beam may also be implemented in an optical position sensing system 900 shown in FIG. 9. The system 900 operates based on the control mechanism generally shown in FIG. 8. A switching array 940 has multiple of reflectors engaged to their respective actuators to switch input signal channels to various output channels as illustrated in FIGS. 1A, 1B, 1C, 4, 5, 6, 6A and 6B. A control circuit controls the actuators to set the reflectors in their desired switching positions and maintain the reflectors in such switching positions according to position sensing signals from position sensors. The position sensors here use an auxiliary reflector 910 engaged to an actuator and a position-sensing photodetector 910, both located at predetermined positions with respect to the switching array 940. The reflector 910 is "auxiliary" because it only directs an auxiliary servo beam 901 from a light source 902 for alignment control and monitoring and does not direct any signal beams. In particular, the auxiliary reflector 910 can be adjusted with respect to two orthogonal rotation axes to project the auxiliary servo beam 901 to any of the reflectors in the switching array 940, one at a time. The wavelength of the auxiliary servo beam 901 may be different from that of the signal beams that are switched by the switching array 940.

A position-sensing unit 920 is used to measure and set the orientations of the reflector 910 to preset positions to direct the servo beam 901 to the back surface of different reflectors in the switching array 940. The designs shown in FIGS. 7A and 7B may be used to implement the unit 920 which includes a position-sensitive detector 921 and a light source 922. The position of a beam from the light source 922 on the sensing surface of the detector 921 have a one-to-one correspondence with the orientations of the auxiliary reflector 910 and are used as a reference to set the orientations of the reflector 910. A control unit 923 uses the position signal from the detector 921 to control the orientations of the reflector 910. The auxiliary reflector 910 hence directs the servo beam 901 to the back surface of any reflector in the switching array 940.

A position-sensitive detector 950 is designated to each reflector in the switching array 940 to receive the reflected servo beam 901 from the back surface of the reflector. This detector is located at a second predetermined location with respect to the respective reflector to determine the direction of the reflected beam 901. This information is then used to determine the orientation of the respective reflector. A control unit 960 uses the output from the detector 950 to set and maintain the reflector at each desired switching orientation.

Figure 9A:
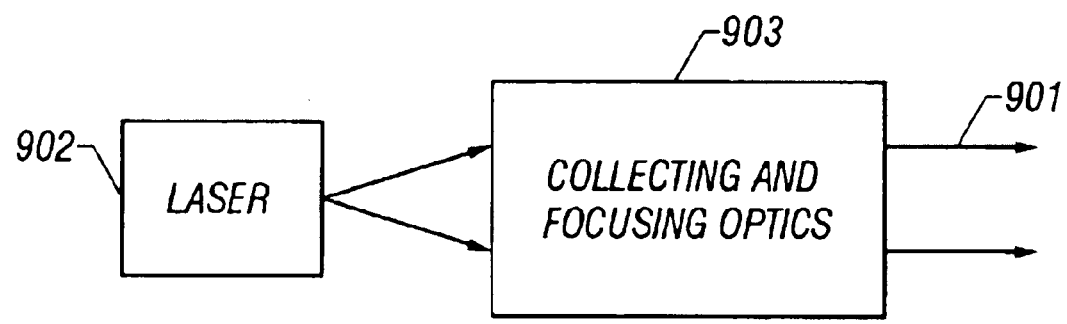
Figure 9B:
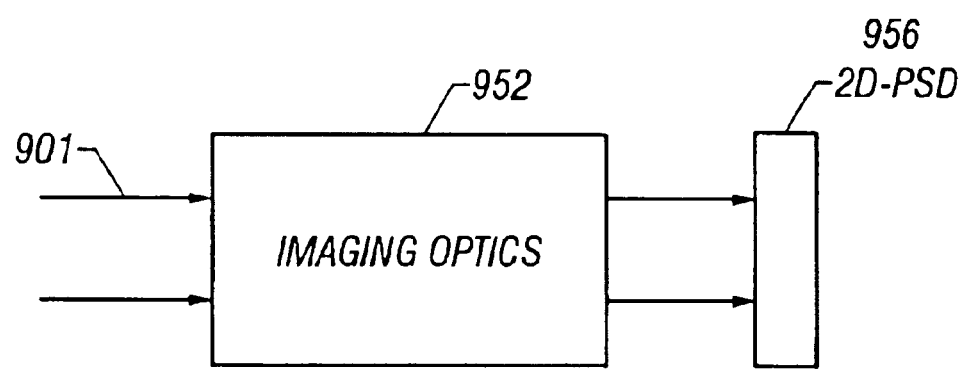

FIG. 9A further shows that a collimating optical element 903 such as a lens may be used to collimate the servo beam 901. FIG. 9B shows that an imaging optical element 952 may be used to image the reflected beam 901 onto the detector 950.

Figure 10:
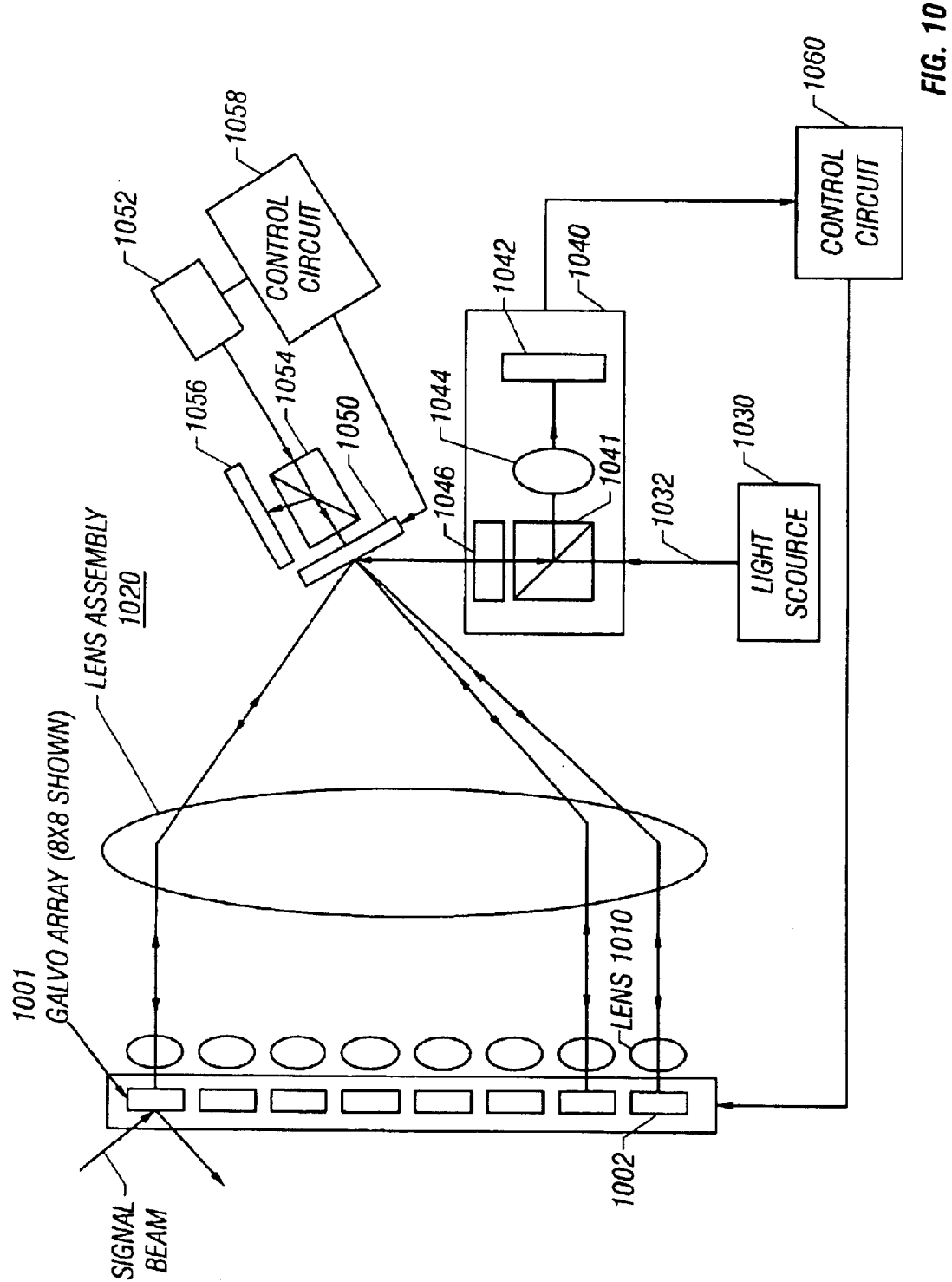

FIG. 10 shows another optical position sensing system 1000 that uses an auxiliary servo beam 1032 to monitor the orientation of each reflector 1002 in a switching array 1001. The servo beam 1032 is generated from a light source 1030 and is substantially collimated. An auxiliary steering reflector 1050 is positioned to direct the servo beam 1032 to the back reflective surface of each reflector 1002 in the switching array 1001 one at a time. A lens assembly 1020 is placed between the switching array 1001 and the steering reflector 1050 to couple the servo beam 1032 to the switching array 1001. Lenses 1010 are respectively positioned in the back of the reflectors 1002 to project the servo beam 1032 to the respective back reflective surfaces of the reflectors 1002. The lens assembly 1020 and the steering reflector 1050 are positioned so that the servo beam 1032 can be directed to different individual reflectors 1002, one at a time, by adjusting the steering reflector 1050 at preset orientations. The position sensors shown in FIGS. 7A and 7B may be implemented in the steering reflector 1050 to measure and control its orientations through an auxiliary control circuit 1058. For example, an optical position sensor with a beam splitter 1054, a position-sensing photodetector 1056, and a light source 1052 may be used as illustrated. The servo beam 1030, upon reflection at the back surface of each reflector 1002, is directed back to the steering reflector 1050 through the lens assembly 1020 for measuring the orientation of that selected reflector 1002.

An optical position sensor module 1040 may be placed to receive the reflected servo beam 1032 from the steering reflector 1050 to measure the orientation of the selected reflector 1002. In the example shown, the module 1040 includes a beam splitter 1041, a lens 1044, and a position-sensing photodetector 1042. The beam splitter 1041 directs the reflected servo beam 1032 to the sensing surface of the detector 1042. The beam splitter 1041 may be a polarization beam splitter and a quarter wave plate 1046 may be placed to make the polarization of the reflected servo beam 1032 to be orthogonal to the original servo beam 1032 so that the entire reflected servo beam can be directed to the detector 1042. The system 1000 can be calibrated to associate different orientations of each reflector 1020 to different beam positions on the sensing surface of the detector 1042 and hence a reflector control circuit 1060 can be used to control the reflector 1002 in response to the measured position of the reflected servo beam 1032 on the detector 1042.

Figure 11:
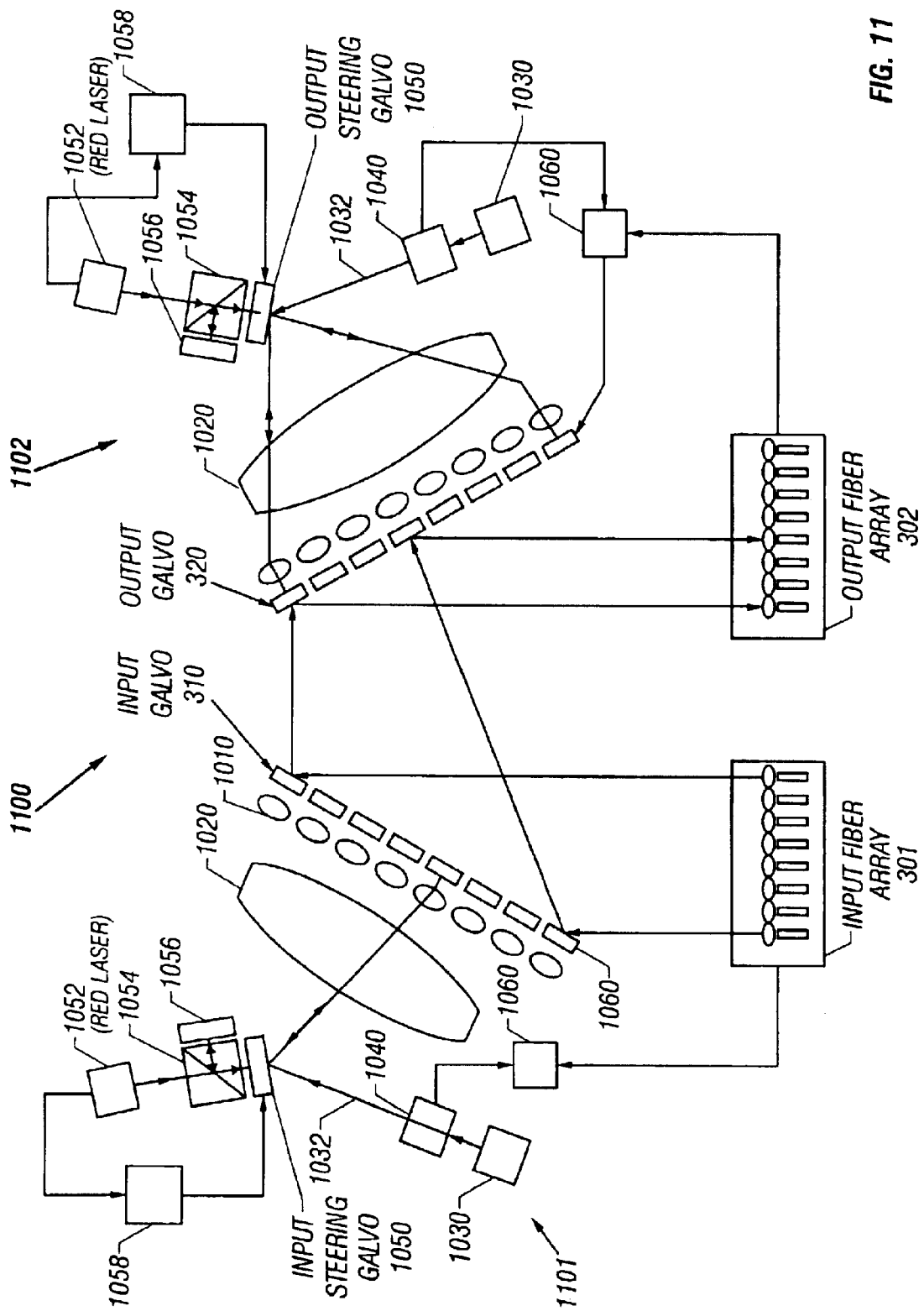

The above system 1000 in FIG. 10 may be incorporated into any linear array of reflectors to avoid using a position sensor in each individual reflector as illustrated in FIGS. 7A and 7B. For example, the system 1000 may be implemented in each linear switching array in the non-blocking switching arrays shown in FIGS. 4, 5, and 6. For example, FIG. 11 illustrates that the system 1000 in FIG. 10 may be used to provide position sensing and controlling to an actively controllable switching system 1100 based on the switching architecture 600 shown in FIG. 6. The orientations of the reflectors in linear switching arrays 610 and 620 are respectively controlled by the optical sensing systems 1101 and 1102. The two control circuits 1060 for the two different arrays 610 and 620 may be combined into a single control circuit.

In addition to optical position sensing locally at each reflector, a global optical sensing mechanism may be further implemented to optically monitor and measure the overall alignment of a signal-beam that is controlled by two or more reflectors. The local optical sensing may be used to provide a coarse position control and the global optical sensing may be used to provide a fine position control. These two different optical position controlling mechanisms may be combined to enhance the accuracy of the optical alignment in a switching array. The global optical position sensing may be implemented by using a signal beam or a global servo beam independent of the signal beam. Different from the local position sensors in FIGS. 7A and 7B, the global optical sensing does not directly indicate the position errors of individual switching elements in the optical path of a signal beam. Rather, a parameter related to the beam position on the output fiber is measured to indicate the total effect of position errors from two or more switching elements in the path of the signal beam on the final position of the beam on the output fiber.

FIG. 12 shows one embodiment of a global optical position sensing system by measuring positions of the signal beams from the switching array 1210 at the receiving optical apertures of output terminals 1220. A position-sensing photodetector 1222 is placed in front of each receiving optical aperture of an I/O fiber 1220 to measure the position of the received signal beam with respect to the center of the fiber core. A position signal 1224 is generated by each photodetector 1222 to indicate the amount of the position offset at the respective receiving I/O fiber. A global control circuit 1230 responds to each position signal 1224 to generate an alignment control signal 1232 to control at least one of the two or more reflectors in the optical path of the signal beam associated with the position signal 1224 to reduce the alignment error at the respective I/O fiber 1220.

FIG. 12A is a side view along the line A–A' of the detector 1222 and the receiving I/O fiber 1220. FIG. 12B is a view along the line B–B' in the optic axis of the fiber 1220. In front of the optical receiving aperture of each I/O fiber 1220, a coupling lens 1223 is used to couple a beam into or out of the fiber core. The position sensing photodetector 1222 may include two bi-cell detectors 1222a and 1222b each with two sensing cells. The detectors 1222a and 1222b may be placed between the fiber aperture of the fiber 1220 and the lens 1223 in the opposing sides of the fiber core. Hence, the signal difference between (A+C) and (B+D) indicates the alignment error along one direction and the signal difference of (A+B)−(C+D) indicates the alignment error along the orthogonal direction. The positioning signals 1224 include information on these signal differences and are fed to the global control circuit 1230 to control the relevant reflectors in the switching array 1210.

Figure 13:
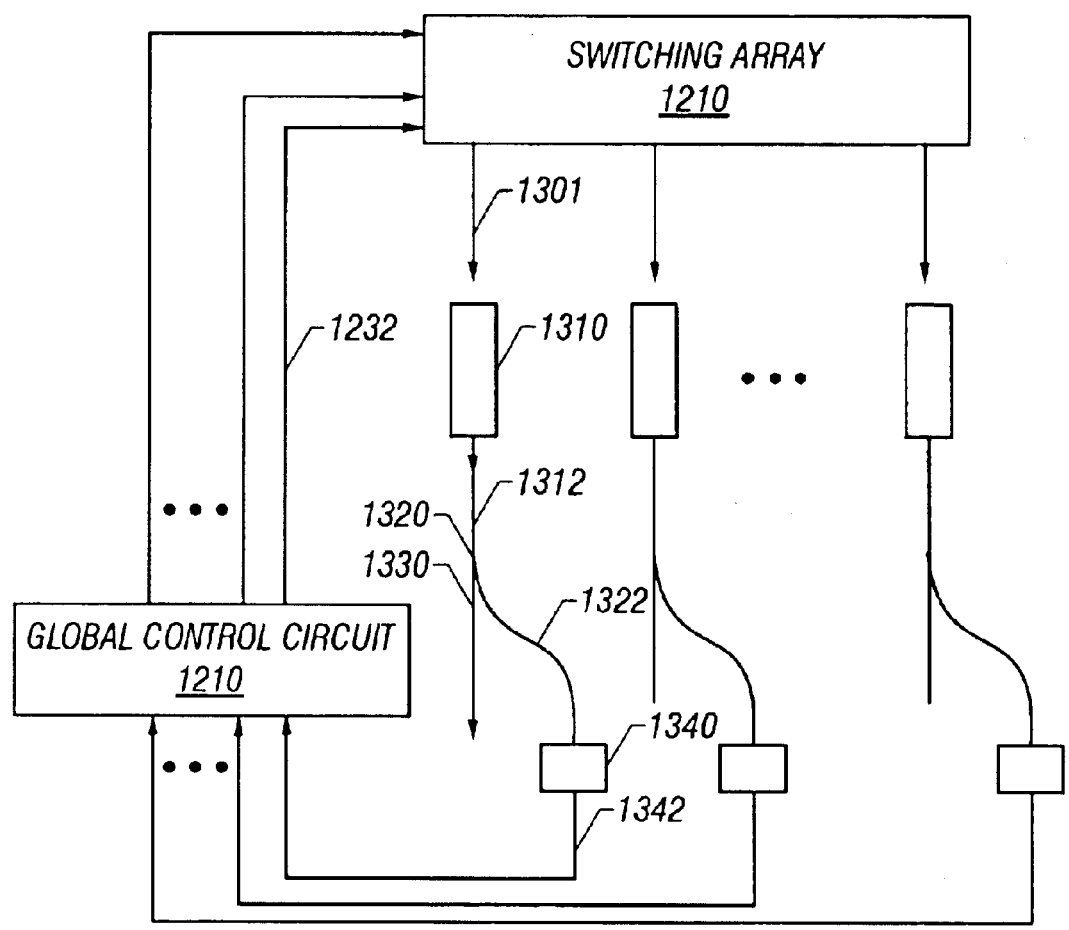

FIG. 13 shows another embodiment of a global optical position sensing system that measures signal beams at the receiving optical apertures of I/O fibers to determine optical alignment of the signal beams. A fiber coupler 1320 is used to tap a small fraction, e.g., several percent, of the received signal beam 1301 from the output fiber 1312, into a fiber 1322. The majority of the optical power 1312 remains in the output fiber 1330. A photodetector 1340 is coupled to the fiber 1322 to receive the taped optical power and to produce an indicator signal 1342. The greater the power coupled into the output fiber 1312 with coupling optics 1310, the smaller the overall alignment error in switching the signal beam 1301. The positions of the reflectors in the switching elements that reflect the beam 1301 in the switching array 1210 should be adjusted to maximize the output power in the output fiber 1312.

The global control circuit 1210 may be operable to offset the position of at least one of the reflectors that reflect the beam 1301 in the switching array 1210 to increase the signal 1342. The offsets in the position of one or more relevant reflectors may be in both orthogonal directions until the positions at which the signal 1342 reaches its maximum. A predetermined adjustment routine may be used to adjust the two or more reflectors in the path of the beam 1301 in the switching array. As illustrated in FIG. 13, the control circuit 1230 receives such an indicator signal from each output fiber and controls the actuators on the respective reflectors that reflect the output beam to that output fiber. Thus, all output power levels at their respective output fibers are maximized.

The above global position sensing techniques need the presence of the signal beams. Alternatively, a designated global servo beam may be generated at each input port of a switching array to substantially overlap with the corresponding signal beam throughout the switching array. Hence, in absence of signal beams, the reflectors in the switching array can still be aligned by using the global servo beams. The wavelength of the alignment beam may be selected to be different from that of the input signal beam and hence can be separated at a respective output port by using a wavelength-selective coupling element. In this case, the front reflector surface of the reflector in each switching element is dichroic to efficiently reflect both the signal and the servo beams. Either the power of the servo beam or its position at a position-sensing photodetector may be used to generate an indicator signal.

Figure 14:
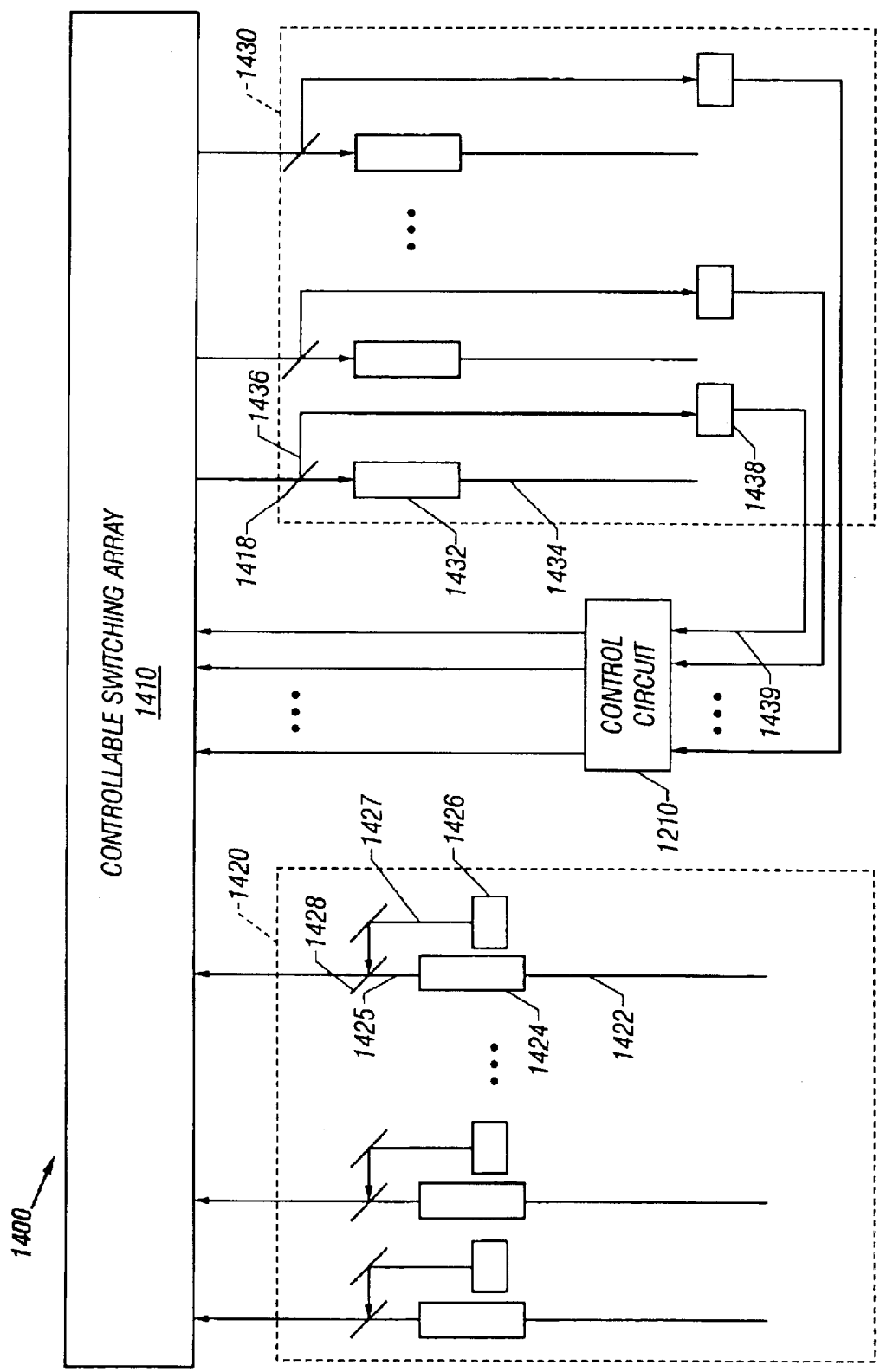

FIG. 14 shows a switching array 1400 that uses global servo beams that respectively track the signal beams to implement the global optical position sensing. The system 1400 includes a non-blocking switching array 1410, an input module 1420, an output module 1430, and a global control circuit 1210. At each input, an input fiber 1422 is coupled to a coupling optical module 1424 to direct an input beam 1425 in free space to the switching array 1410. A light source 1426, such as a LED or diode laser, is used to generate an alignment beam 1427 at a wavelength different from the input signal beam 1425. For example, the input signal beam 1425 may be at about 1550 nm while the alignment beam 1427 may be in the spectral range from about 500 nm to about 900 nm. A dichroic beam splitter 1428 is implemented to combine the beams 1425 and 1427 to co-propagate in the switching array 1410. Hence, the direction of the alignment beam 1427 at the output module 1430 represents the direction of the signal beam 1425. The positioning information of the alignment beam 1427 is therefore used to control the relevant reflectors in the switching array 1410.

At each output in the output module 1430, another dichroic beam splitter 1428 is used to separate the alignment beam 1427 from the input signal beam 1425. The input signal beam 1425 is directed into a coupling optical element 1432 and the proper output fiber 1434. The alignment beam 1427, on the other hand, is directed to a position-sensing photodetector 1438 such as a quad detector or an array of photosensing pixels. The photodetector 1438 is positioned and calibrated so that a reference location on its sensing surface can be used to represent a desired alignment for the signal beam 1425 into the output fiber 1434. An indicator signal 1439, representing a deviation from the reference location, is sent to the control circuit 1210 to adjust the relevant reflectors that reflect the beams 1425 and 1427.

Figure 14A:
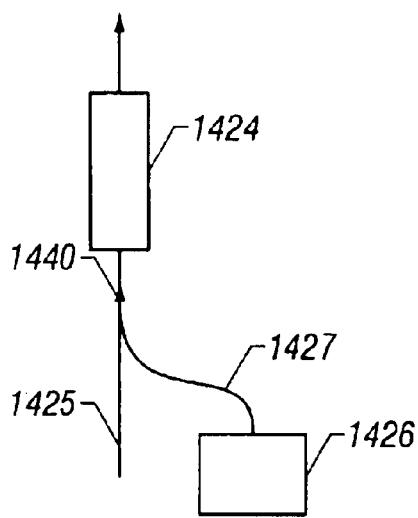

FIG. 14A shows another embodiment for combining the alignment beam 1427 with the input signal beam 1425. A wavelength-selective fiber coupler 1440 is used to couple the alignment beam 1727 into the input fiber 1422. The output of the coupling element 1424 thus has both the signal beam 1425 and the alignment beam 1427.

Figure 14B:
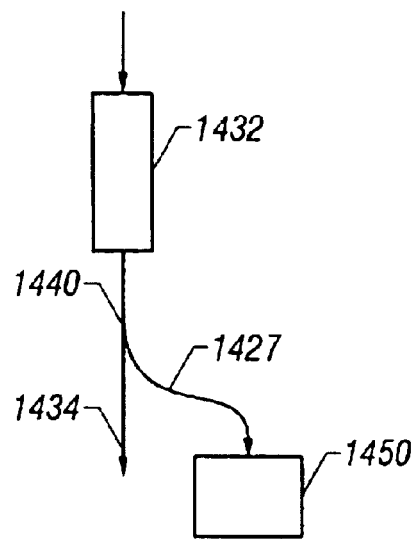

FIG. 14B also shows an alternative embodiment for each output in the output module 1430. The coupling optical element 1432 couples both beams 1425 and 1427 into the output fiber 1434. A wavelength selective fiber coupler 1440 is coupled to the output fiber 1434 to couple only the global servo beam 1427 out to a photodetector 1450 to measure its power. The control circuit 1210 adjusts the relevant reflectors to increase or maximize the output power of the global servo beam 1427. Different from the system in FIG. 13, the global servo beam 1427 has a wavelength different from the signal beam 1425. Hence, the global servo beam 1427 may be selected at a visible or near-infrared wavelength to reduce the cost of the light source 1426 and the detector 1450.

Figure 15:
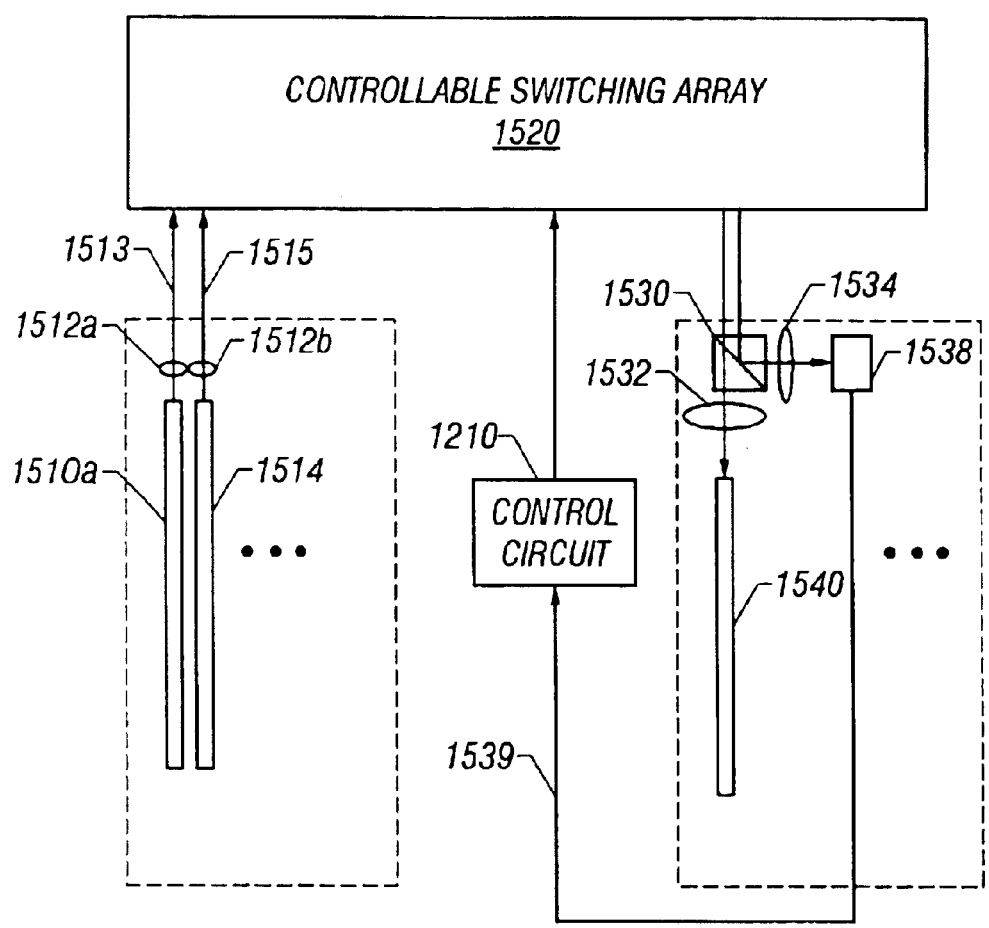

FIG. 15 shows yet another exemplary switching system that uses designated global servo beams to implement the global optical position sensing. Two separate input fibers 810 and 814 are arranged in parallel and close to each other to respectively carry an input beam 1513 and a servo beam 1515 at different wavelengths. A signal coupling optical element 1512a such as a lens or microlens is used to direct the signal beam 1513 into the switching array 1520. A servo coupling optical element 1512b is used to direct the servo beam 1515 in parallel to the signal beam 1513 to the switching array 1520. Hence, the beams 1513 and 1515 co-propagate along two slightly displaced and parallel optical paths in the switching array 1520 and are reflected by the same reflectors. At the output for each channel, a dichroic beam splitter 1530 is positioned to receive and split the beams 1513 and 1515 into two different paths. The signal beam 1513 transmits through the beam splitter 1530 and is coupled into the output fiber 1540 via a lens 1532. The servo beam 1515 is reflected by the beam splitter 1530 to a position-sensing photodetector 1538 through another lens 1534. A reference location on the sensing surface of the detector 1538 is used to align the servo beam 1515 to hit on a desired location on the detector 1538. This alignment also aligns the signal beam 1513 with respect to the output fiber 1540. A position indicator signal 1539 generated by the detector 1538 is used by the control circuit 1210 to control the relevant reflectors that direct the beams 1513 and 1515. FIG. 15 only illustrates one input and its corresponding output. Other input and output channels may be constructed and operate similarly.

It is contemplated that, different optical position-sensing techniques may be combined together in a single switching array. For example, any of the local optical position sensing systems shown in FIGS. 7A, 7B, 9, 10, and 11 for coarse aligning of individual reflectors and the global position-sensing systems shown in FIGS. 12, 12A, 12B, 13, 13A, 13B, 14, and 15 for fine aligning of the overall optical alignment of each signal beam. A combination of such coarse and fine positioning sensing and controlling systems may provide operational advantages over either of the systems when used alone.

For example, the local optical position sensing can be used to monitor and control the orientation of each individual reflector to one or more preset orientations. Such local servo control, however, may not be adequate to ensure the proper alignment effectuated by two or more reflectors from an input terminal to a desired output terminal since various changes and variations in the switching system may cause the overall alignment of a particular optical path deviate from what was intended by the preset orientations. The global control, on the other hand, provides a measurement for the alignment error of an entire optical path but does not explicitly indicate the specific alignment error in each reflector in that optical path. The combination of the local and global optical position sensing mechanisms thus can be used to achieve robust optical switching operations with both local and global control.

The systems shown in FIGS. 13 and 14B may also be used to control the amount of optical energy of the signal beam that is coupled into the output fiber 1330 or 1434. Such variable optical coupling is done by adjusting one or more reflectors in the optical path of a signal beam to set its power at a desired value at the output fiber. Hence, the amounts of optical energy of different signal beams to their respective output fibers can be individually adjusted. This mechanism may be used to adjust the relative optical signal levels in different output fibers for, e.g., equalizing the signal strengths of different output WDM channels in a WDM system.

Figure 16:
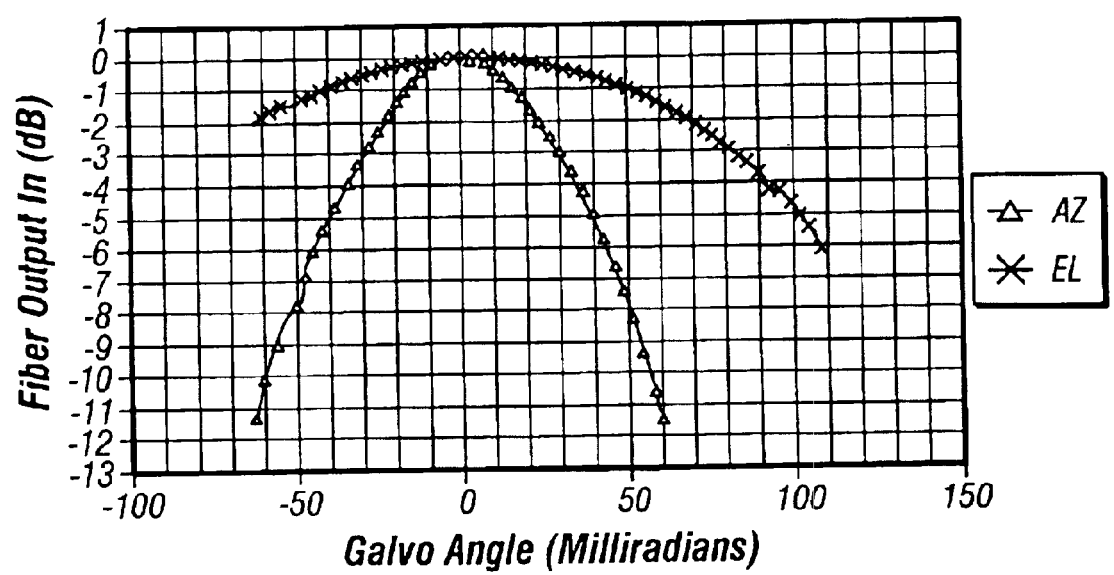
FIG. 16 shows measured optical power at a receiving optical fiber as a function of azimuth and elevation angles, respectively, in switching arrays shown in FIGS. 13 and 14B.

FIG. 16 illustrates how the optical power of a signal beam coupled into an output fiber varies with the either the azimuth angle or the elevation angle of one reflector in the optical path of the signal beam. The angle of the reflector where the coupling power is maximum is represented by 0 degree. This offset control is a feedback system that monitors the tap fiber amplitude, and modifies one or more reflectors in order to keep the tap amplitude at a preset constant level.

The following describes control techniques and control mechanisms for controlling the above actively-controllable switches in an optical switch array. Controlling of the switching array shown in FIG. 6 with two linear arrays of 2D switches (e.g., an 8 by 8 switch array) is described as an example to illustrate some of the techniques and the designs of the control modules.

Figure 17:
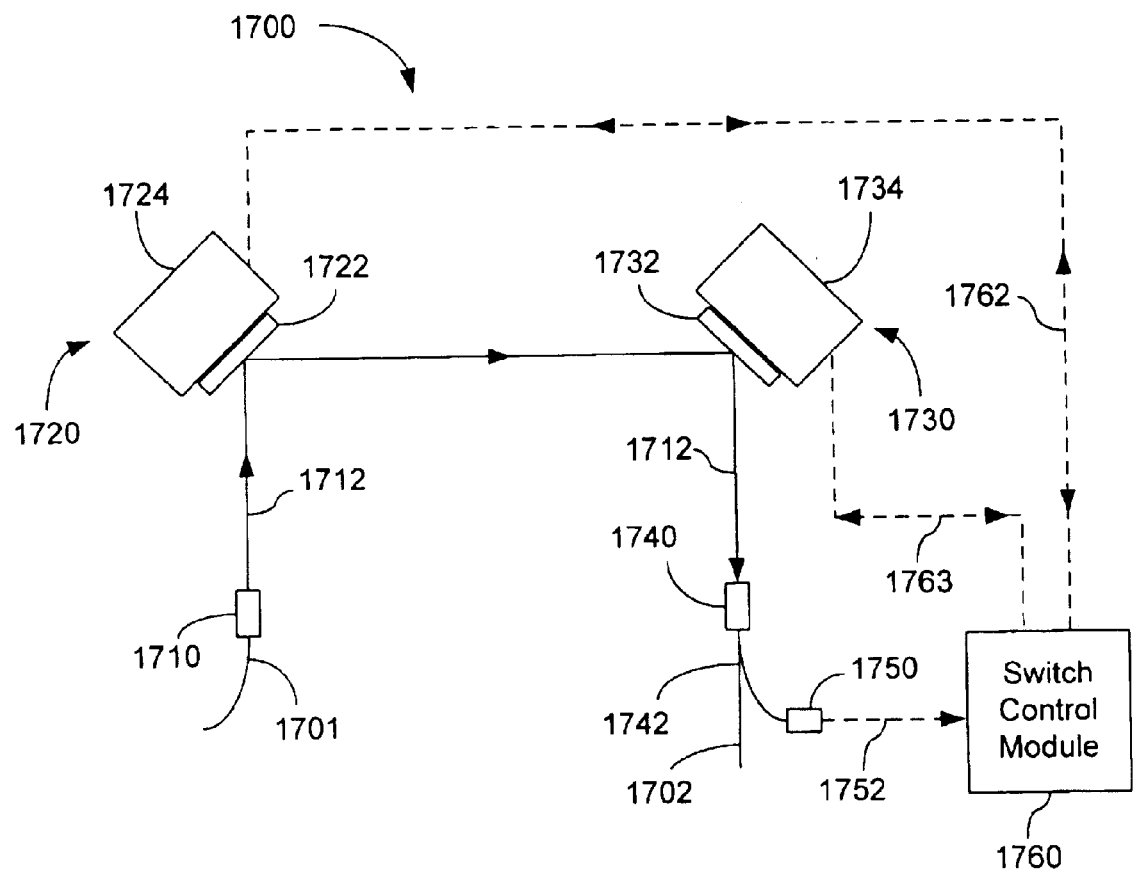
FIG. 17 shows a portion of an optical switching array where an input optical beam is directed to an output fiber through two switches.

FIG. 17 shows a portion of an exemplary optical switch array 1700 in which a path of a signal beam being switched includes an input collimator 1710, an input 2-axis actuator-controlled reflector switch 1720, an output 2-axis actuator-controlled reflector switch 1730, and an output collimator 1740. The collimators 1710 and 1740 are coupled to an input fiber 1701 to receive an input signal beam 1712 and to an output fiber 1702 to export the switched signal beam 1712, respectively. Each of the reflector switches 1720 and 1730 includes an actuator unit 1724 or 1734 and a reflector 1722 or 1732 which either has a rear reflective surface or is engaged to another reflector. The actuator unit 1724 and 1734 includes the actuator and the optical monitoring element as shown in FIGS. 7A and 7B. The actuator in each reflector switch may be, e.g., a 2-axis galvanometer that rotates around two different rotational axes substantially orthogonal to each other. The 2-axis galvanometer switches 1720 and 1730 operate in combination to steer the beam from the input collimator 1710 to the desired output collimator 1740. Each 2-axis galvanometer has two independently-driven coils that move the mirror, one to rotate in the azimuth direction and one in the elevation direction. Each axis may have its own control mechanism and can be set independently from the other. Hence, the optical path of the signal beam 1712 has a total of 4 degrees of freedom to completely control the position and incident angle of the beam 1712 on the output collimator 1740.

The optical monitoring unit in each reflector switch uses a 2-dimensional photo sensing device, such as a PSD (Position Sensing Device), to measure the actual orientation of the respective reflector by measuring the optical reflection of a separate optical monitor beam from its rear reflective surface or the rear reflector. A feedback control is then used to accurately move the reflector to the desired orientation that reflects the signal beam 1712. One or more additional galvanometer reflector switches may be added in such a signal path if needed.

Further shown in FIG. 17, a tap coupler 1742 may be coupled to the output collimator 1740 or the output fiber 1702 to split a small fraction of the output power received by the output collimator 1740 to monitor the power level of the output. This provides a mechanism to monitor the overall optical alignment of each optical signal beam in the optical switch array and may be used to provide a fine adjustment to each switch element in the optical path of the beam. This mechanism combines with the local feedback control in each switching element to control the optical alignment of each switching element at both the local level and the global level. At the local level in each switch element, the error in orientation of the actuator measured by the optical position sensor (e.g., 1850 in FIG. 18) is reduced by the local feedback loop. At the global level, the error in alignment of the signal beam directed by the switches 1720 and 1730 is measured by the signal 1752 and is reduced by adjusting one or both of the switches 1720 and 1730. Other techniques for monitoring the overall alignment of each signal beam, e.g., the methods of using a beam separate from the signal beam shown in FIGS. 14 and 15, may also be used. One implementation of the tap coupler 1742 is illustrated as an element 1320 shown in FIG. 13 where a fiber coupler is used in the output fiber 1702. An optical detector 1750 is used to receive and measure the low-power split beam to represent the output power when the power split ratio of the fiber coupler is known. Based on this measurement, the control system of the switch array 1700 may also control the amount of the spatial offset of the beam 1712 on the output collimator 1740 in order to attenuate the output signal in the output fiber 1702. Thus, the output level can be dynamically adjusted to keep at a pre-determined or other desired level. Either or both of the galvanometers of the reflector switches 1720 and 1730 may be adjusted, in response to the output 1752 of the detector 1750, to control the output level. If each signal beam is controlled by two switches in the array 1700, an N×N switch array needs 2×N galvanometer reflector switches, where any input galvanometer reflector switch can direct the beam from its collimator to any output galvanometer reflector switch.

The optical switch array 1700 includes a switch control module 1760 that performs the control operations of the switches 1720 and 1730 in each signal path. The control module 1760 is connected to communicate with the reflector switches 1720 and 1730 via the communication links 1762 and 1763, respectively. Such communication links 1762 and 1763 transfer the positioning signals output by the optical detectors in the switches 1720 and 1730 and send the control signals from the control module 1760 to drive the actuators in the switches 1720 and 1730, respectively. The detector output 1752 from the detector 1750 is also fed into the control module 1760 for monitoring the actual power received by the output fiber 1702.

Figure 18:
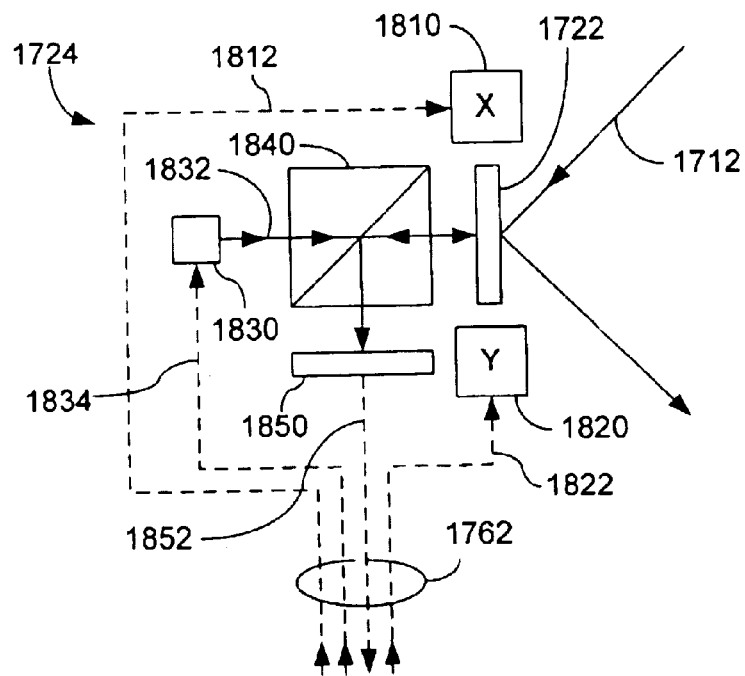
FIG. 18 shows one embodiment of an actuator module for a 2D switch with local optical position sensing mechanism.

FIG. 18 shows additional details of the actuator unit 1724 of the reflector switch 1720 in FIG. 17 based on the design in FIG. 7B. The actuator unit 1734 for the reflector 1732 is similarly constructed and operated. The actuator includes two actuator control elements 1810 and 1820 that are independently controlled to adjust the orientation of the reflector 1722 to redirect the signal beam 1712. For example, the elements 1810 and 1820 may be two coils in a 2-axis galvanometer actuator. Alternatively, the elements 1810 and 1820 may be two 1-axis actuators that control the reflector 1722 to rotate around two orthogonal axes. Assuming the rear surface of the reflector 1722 is also reflective, a monitor beam 1832 from a monitor light source 1830 is directed to and reflected by the rear surface to measure the actual orientation of the reflector 1722. In an alternative implementation, a second reflector may be fixed to the back of the reflector 1722 to reflect the monitor beam 1832. In either implementation, a photodetector 1850 is fixed at a location to receive and measure the position of the reflected beam 1832. This position on the detector 1850 can be calibrated to represent a particular orientation of the reflector 1722 SO that different positions represent different orientations of the reflector 1722. The beam positions on the detector 1850, therefore, are used by the control module 1760 to control the orientation of the reflector 1722 either to fix at a desired orientation against any deviation or to change it from one fixed orientation to another during a switching operation. A beam splitter 1840 is placed in the optical path of the beam 1832 to direct the reflected beam 1832 to the detector 1850.

As illustrated in FIG. 18, the communication link 1762, which may be electrical in nature, includes 3 control signals 1812, 1822, and 1834 from the control switch module 1760 and one output signal 1852 to the control switch module 1760. The control signals 1812 and 1822 are used to control the actuator control elements 1810 and 1820, respectively, to control the orientation of the reflector 1722. The output signal 1852 is produced by the detector 1850 which has the position information of the reflected beam 1832 on the detector surface. The control module 1760 uses this signal 1852 to determine whether the reflector 1722 is oriented as it is directed or recommended by operation of the control signals 1812 and 1822. If not, at least one of the control signals 1812 and 1822 is adjusted to set the reflector 1722 at the desired orientation.

The control signal 1834 to the light source 1830, e.g., a diode laser or a light-emitting diode, is an optional control and is used to control the output power of the light source 1830 substantially constant by adjusting the driving current. The output optical power of the laser diode or the light-emitting diode may vary with the temperature and other factors, such as aging over time and position. This change in power of the reflected monitor beam 1832 received by the detector 1850 may cause a variation in the output signal 1852. Such variation may significantly affect the position information in the signal 1852 and may also adversely affect the operation of the processing circuit within the control module 1760. For example, the processing circuit is designed to handle the signal within a certain preset operating range of signal amplitude. When the signal amplitude is out of the preset operating range, the processing circuit may not operate properly or even fail. Hence, it is desirable to stabilize the output power of the light source 1830.

Figure 19:
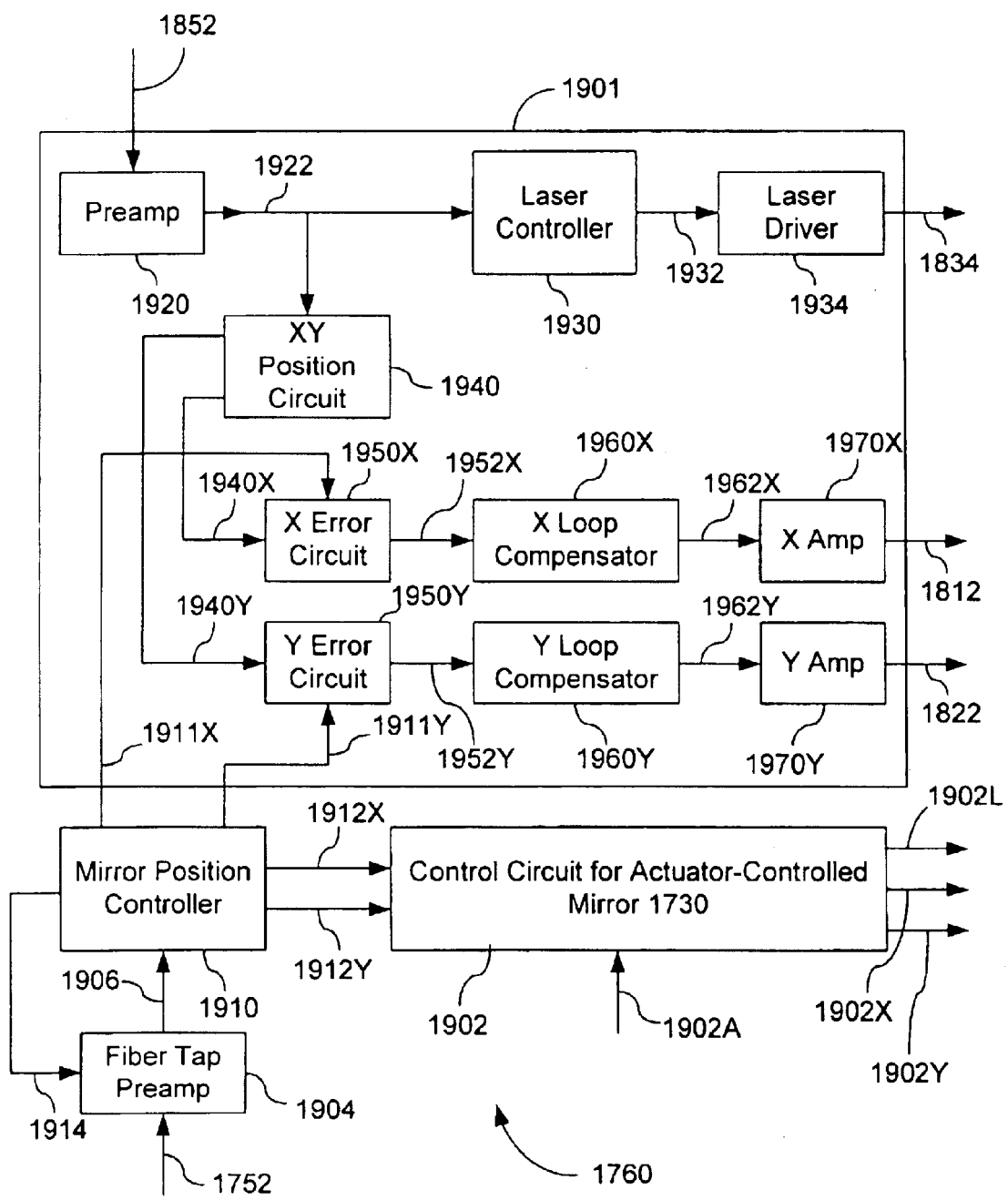
FIG. 19 shows one embodiment of a switch control module in the switching array shown n FIG. 17.

FIG. 19 shows main components of the control module 1760 according to one embodiment. The control module 1760 has a control circuit 1901 that produces the control signals 1812, 1822 for respectively controlling X and Y rotations of the actuator for the input switch 1720 and the control signal 1834 for controlling the monitor light source 1830. The control circuit 1901 for the input switch 1720 operates in response to two separate inputs, the detector output 1852 from the detector 1850 and the position input signal comprising of position control signals 1911X and 1911Y.

The detector output 1852 has information on (1) the total optical power of the reflected monitor beam 1832 received by the detector 1850 and (2) the position of the beam 1832 on the detector 1850. For example, the detector 1850 may be a PSD with 4 sensing quadrants that respectively produce 4 output signals 1852. The intensity distribution in the 4 quadrants represents the position of the beam 1832 and the sum of the 4 output signals represents the total optical power of the reflected monitor beam 1832.

The position control signals 1911X and 1911Y, on the other hand, are used to "command" the control circuit 1901 to set the orientation of the reflector 1722 of the input switch 1720 at a particular desired orientation. During the normal operation, when the signals 1911X and 1911Y are given, the control circuit 1901, the actuator control elements 1810 and 1820, and the detector 1850 form a feedback control loop to maintain the orientation of the reflector 1722 at the particular desired orientation against any deviation. The control circuit 1901, the monitor light source 1830, and the detector 1850 also form another feedback control loop for stabilizing the power of the monitor beam 1832.

In parallel to the control circuit 1901, a second control circuit 1902 is similarly constructed and coupled to control the output switch 1730 by the light control signal 1902L and the X and Y control signals 1902X and 1902Y in response to a detector output 1902A similar to the signal 1852 and signals 1912X and 1912Y similar to signals 1911X and 1911Y, respectively. Hence, for the switching array 600 with two arrays 610 and 620 of 2D switching elements shown in FIG. 6, the switch control module should include an array of control circuits 1901 respectively coupled to control switching elements in the array 610 and an array control circuits 1902 respectively coupled to control switching elements in the array 620. The control circuits 1901 and 1902 may be integrated in the same circuit board or integrated package in actual implementations and may also be integrated with the controller 1910 in the same circuit board or integrated package. The following describes the connections and operations of the control circuit 1901 only for simplicity.

The control module 1760 has a mirror position controller 1910 for generating the control signals 1911X and 1911Y to the control circuit 1901. The controller 1910 includes a memory circuit that stores predetermined orientation combination of the reflector 1722 in the input switch 1720 and the reflector 1732 in the output switch 1730 for all possible routing combinations. For example, the N×N switch array shown in FIG. 6 has N×N combinations, where each combination has one orientation of a reflector in the input switch array 610 and another reflector in the output switch array 620. Such orientation combinations are obtained through a calibration and training process during the initial configuration of the switch array and may be stored as a lookup table in the controller 1910. In one implementation, the controller 1910 may be a digital controller with digital-to-analog and analog-to-digital interfaces. Because the circuits 1901 and 1902 are generally implemented as analog circuits, the control signals 1911X, 1911Y, 1912X, and 1912Y should be analog signals.

Referring back to FIG. 17, the control module 1760 is connected to the detector 1750 that monitors the received power at the output collimator 1740 and the output fiber 1702. The control module 1760 may be designed to use the detector signal 1752 to perform several operations. For example, during the initial setup, the detector signal 1752 may be used to obtain and calibrate the orientations of reflectors in different routing combinations in the switch array that are stored for later switching operations. The maximum power in an output optical port may be used to represent a desired combination of orientations of two switches in a switch operation. This calibration process is used to establish all possible preset orientations of the switch elements for all possible optical paths in the switch array to form a lookup table. The control system then commands two selected switches to such orientations to carry out a particular switch operation.

For a given input power in the signal beam, the difference between the received optical power and the maximum optical power at the output port may be used to represent the error in the overall alignment of the signal beam. Hence, the control system may be used to adjust one or both of the switches in the optical path of the signal beam to reduce this error. The local servo control loop generally operates to lock the orientation of each switch at the position set by the control system by reducing the local error and may so operate without regard to the error in the overall alignment. The local feedback loop control in each switch element and the global fine tuning control for both selected switches based on the signal 1752 are combined to maintain the proper orientations of the two switches.

For another example, the detector signal 1752 may be used to indicate whether there is a failure in a particular switching route from one selected input switch to one selected output switch in the switching array because of a failure in either a particular input fiber or the switching route within the switching array.

In addition, during normal operation, the detector signal 1752 may be used in controlling the amount of the received power in the output fiber 1702 by adjusting at least one of the reflectors 1722 and 1732 to control the orientation and position of the beam 1712 on the input facet of the output collimator 1740. This operation effectuates a variable optical attenuation in switching array to, e.g., control the output powers of different channels.

In the embodiment shown in FIG. 19, the control module 1760 includes an electrical fiber tap preamp 1904 for receiving and amplifying the detector signal 1752 to produce a modified detector signal 1906. The controller 1910 receives and processes the modified detector signal 1906 in controlling the reflectors 1722 and 1732. Because the beam 1712 may be directed into the output collimator 1740 at various directions and positions, the optical power received by the output collimator 1740 may vary from essentially zero when the beam 1712 is absent at the output collimator 1740 to the maximum power when beam 1712 is aligned to the optic axis of the output collimator 1740 and is centered at its facet. Thus, the amplitude of the detector signal 1752 may accordingly vary in a wide range of several orders of magnitude, e.g., by a factor of about $10^4$. To properly process such a detector signal 1752 electronically by the controller 1910, the fiber tap preamp 1904 may be designed to have a variable gain with different gains for different ranges of the signal amplitude. A gain control mechanism is used to switch the gains of the preamp 1904. In one implementation, the controller 1901 may be designed to produce a gain control signal 1914 that is sent to the preamp 1904 to control the gain, e.g., by controlling the gain switches in the preamp 1904.

The following describes certain details of the control circuit 1901 for controlling the actuator unit 1724 within the input switch 1720. The control circuit 1901 may include a laser control part for controlling the monitor laser source 1830 and an actuator control part for controlling the actuator control elements 1810 and 1820 of the reflector 1722. During normal operation, the actuator control part of the control circuit 1901 may operate in either a steady state mode or a transient mode depending on the status of the signals 1911X and 1911Y. When the signals 1911X and 1911Y provide a desired orientation for the reflector 1722 and remain unchanged, the control circuit 1901 operates in the steady state mode to actively maintain the reflector 1722 at that desired orientation. Such desired orientation may be selected from the lookup table for all possible orientations obtained during the calibration process. This is achieved by controlling the orientations around X and Y axes to correct any deviation from the desired orientation based on the local feedback control in each switch and the global control over the two switches in the optical path of the signal beam. On the other hand, when the signals 1911X and 1911 changes their values to command a new orientation, e.g., according to the lookup table, the control circuit 1901 responds by operating in the transient mode by resetting the values of the signals 1812 and 1822 to change the orientation of the reflector 1722. After the reflector 1722 is rotated to the new orientation, the control circuit 1901 then operates in the steady state mode to maintain the reflector 1722 at the new orientation.

The control circuit 1901 may include a preamp 1920 to receive and amplify the detector signal 1852 from the detector 1850 to produce an amplified detector signal 1922. The preamp 1920 may include multiple preamps in parallel that respectively receive and amplify different signals in the signal 1852 from different sensing areas of the detector 1850. The detector signal 1922 is then divided into two signals, one to the laser control part and another one to the actuator control part of the circuit 1901. The laser control part includes a laser controller 1930 and a laser driver 1934. The laser controller 1930 may include a circuit element that converts the detector signal 1922 into a laser power signal that represents the total power of the reflected monitor beam 1832 received by the detector 1850. When the sensing surface of the detector 1850 has different sensing areas such as 4 quadrants in a PSD or a detector with multiple sensing pixels, this circuit element may simply be a summing circuit that adds all signals from different sensing areas of the detector 1850. The laser controller 1930 also includes an error generator that compares the laser power signal to a reference signal that represents the desired total laser power to produce a laser error signal 1932. The laser driver 1934, coupled to receive the laser error signal 1932, uses the error signal 1932 to produce a laser control signal 1834 (e.g., the driving current to a laser diode) that adjusts the output laser power of the laser 1830. Hence, the laser 1830, the detector 1850, the preamp 1920, the laser controller 1930, and the laser driver 1934 form an active laser control feedback loop.

The actuator control part of the control circuit 1901 includes a XY position circuit 1940, X position error circuit 1950X, a Y position error circuit 1950Y, a X loop compensator circuit 1960X, a Y loop compensator circuit 1960Y, X amp 1970X and Y amp 1970Y. The XY position circuit 1940 processes the amplified detector signal 1922 to produce a X position signal 1940X that represents the orientation of the reflector 1722 around the X axis and a Y position signal 1940Y that represents the orientation of the reflector 1722 around the Y axis. Although the signal 1922 has only the information of the position of the reflected monitor beam 1832 on the detector 1850, the position of the reflected monitor beam 1832 has a one-to-one relationship with the orientation of the reflector 1722. Hence, the XY position circuit 1940 is designed to use this relationship to generate the signals 1940X and 1940Y. For example, the XY position circuit 1940 may be an arithmetic circuit capable of processing signals from 4 quadrants of a PSD to produce the signals 1940X and 1940Y.

The controller 1910 produces the position commands 1911X and 1911Y based on predetermined orientations for switches 1720 and 1730 to carry out a particular switch operation. The lookup table for such predetermined orientations may be stored in a memory unit in the controller 1910. The X error circuit 1950X has one connection to the XY position circuit 1940 to receive the X position signal 1940X and another connection to the controller 1910 to receive the X control signal 1911X. The X control signal 1911X sets a desired orientation of the reflector 1722 around the X axis. The X error circuit 1950X compares the actual X orientation in the signal 1940X and the desired X orientation in the signal 1911X to produce an X error signal 1952X indicative of the orientation deviation around the X axis. The X loop compensator 1960X, coupled to the X error circuit 1950X, processes the signal 1952X to produce an X driver signal 1962X that adjusts the X orientation of the reflector 1722 to reduce the error. The X amplifier 1970X amplifies the X driver signal 1962 to produce the control signal 1812 for driving the X actuator element 1810. The Y control signal 1822 is similarly generated.

Figure 20:
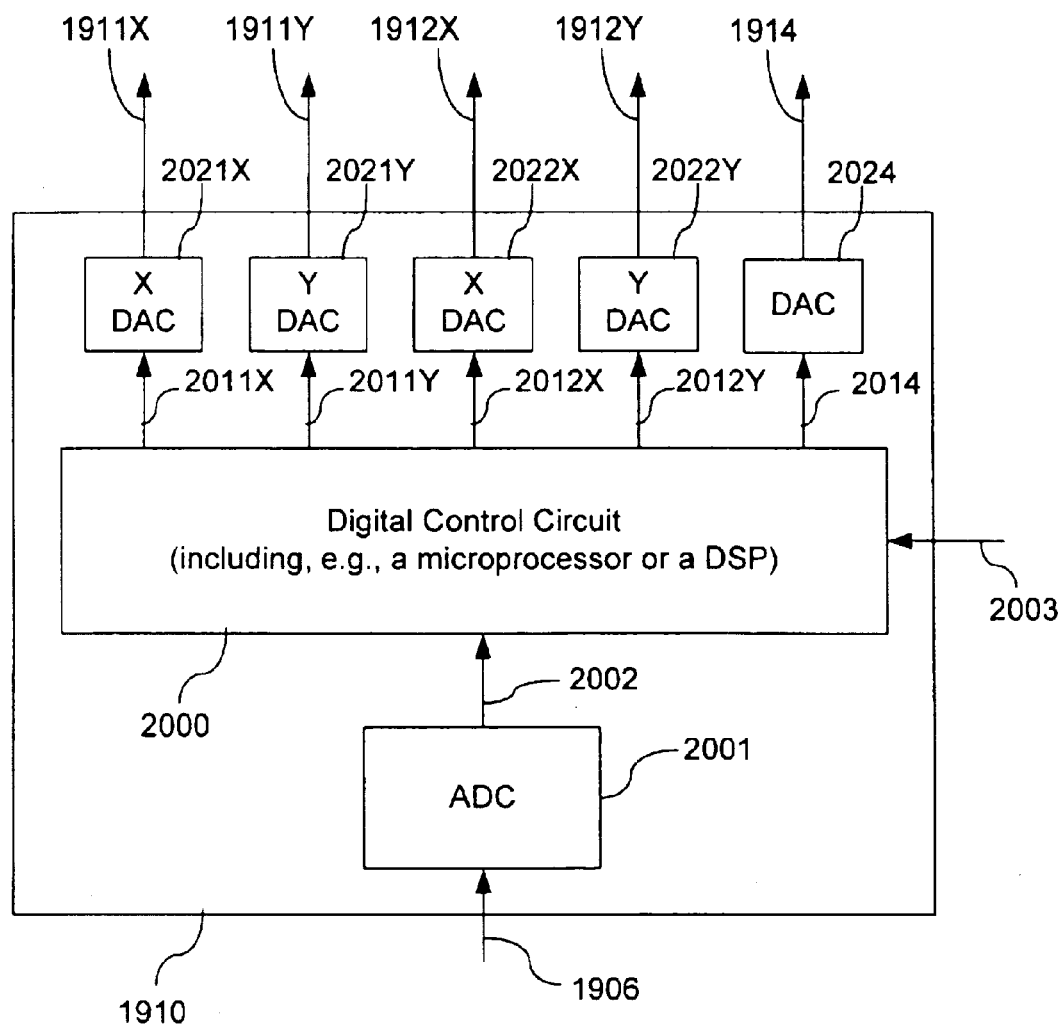
FIG. 20 shows one embodiment of a position controller in the control module of FIG. 19.
Figure 21:
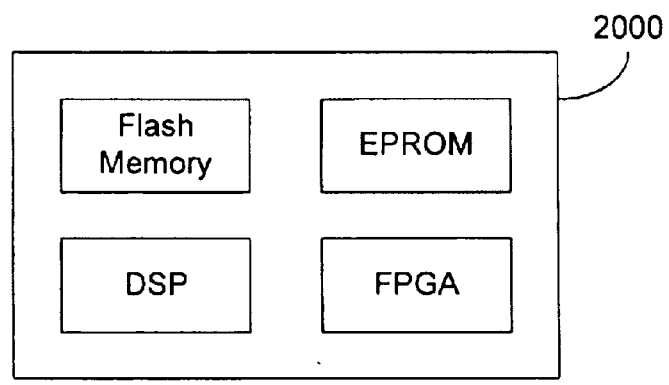
FIG. 21 shows one embodiment of a digital control circuit in FIG. 20.

FIG. 20 shows one embodiment of the position controller 1910 based on a digital control circuit 2000. The digital control circuit 2000 may include a microprocessor or a digital signal processor (DSP) to produce the digital control signals 2011X, 2011Y, 2012X, 2012Y, and 2014 that correspond to the analog signals 1911X, 1911Y, 1912X, 1912Y, and 1914, respectively. Digital-to-analog converters 2021X, 2021Y, 2022X, 2022Y, and 2024 are implemented for the conversion. In addition, an analog-to-digital converter 2001 is used to convert the analog signal 1906 into a digital signal 2002 for processing by the digital control circuit 2000. The digital control circuit 2003 may also include a user interface to receive a user command 2003 from a user to set the orientation of any reflector in the switching array. In one implementation shown in FIG. 21, the digital control circuit 2000 may include a DSP, a flash memory, an EPROM (erasable programmable read-only memory), and a FPGA (field programmable gate array). Hence, the control of the steady-state position loop is done by analog electronics to reduce complexity and power. The position of each reflector is set and controlled by the digital processor.

In the above switching system, an actuator engaged to a reflector rotates the reflector from one position to another to enable switching of the light from one collimator input to another collimator input. In one implementation, this angular rotation may be controlled to have a varying rotation rate that has a low value at the beginning and the end of the rotational movement of the reflector and a high value in the middle range of the rotational movement. In particular, the rotation is gradually reduced towards the end of each rotation to avoid the ringing effect.

Figure 22:
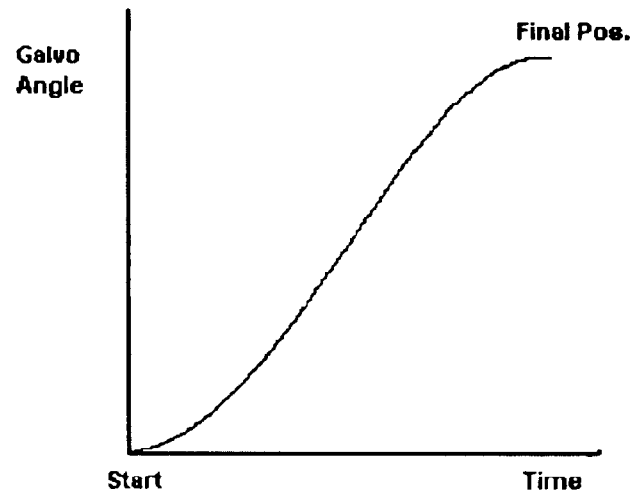
FIG. 22 illustrates a seek trajectory of an actuator reflector to direct the beam.

FIG. 22 shows one exemplary profile where the rotation angle changes with time in a squared-law curve and the rotation angle changes with time in a linear manner when accelerating and decelerating the angular motion of the reflector in moving from one position to a new position. Notably, the rotation rate represented by the slope of the angle-time profile decreases with time at the second half rotation and approaches zero at the end of the rotation. This is to reduce or avoid ringing when the reflector reaches the final angle. The rotational motion profile may be controlled by the digital processor, by inputting new DAC values at regular intervals of time, preferably at intervals as small as possible. The profiles are stored in the processor memory, and the updated DAC values are sent at, e.g., 0.25 millisecond interval. Because the DAC values are updated at intervals, the profile generated at the DAC output is actually the curve shown but with small "stairsteps" at the update intervals. The galvo rotation is controlled over its range by the DAC, and the correct table of DAC values is selected according to the desired angular movement of the reflector. For example, if the actuator is commanded to move 200 DAC (1000 to 1200) counts within 5 milliseconds, the correct table of DAC increments for a 200 count move would be looked up in the memory, and the DAC would be updated 5/0.25 or 20 times in moving the reflector. Once the actuator arrives at the final position, light is detected at the output fiber.

When light is detected at the output fiber, the digital processor uses a "hill-climbing" algorithm to maximize the light coupled to the fiber. The actuators in the input and output switches 1720 and 1730 are adjusted in azimuth and elevation until the maximum light is detected on the fiber tap amplifier 1904.

Figure 23:
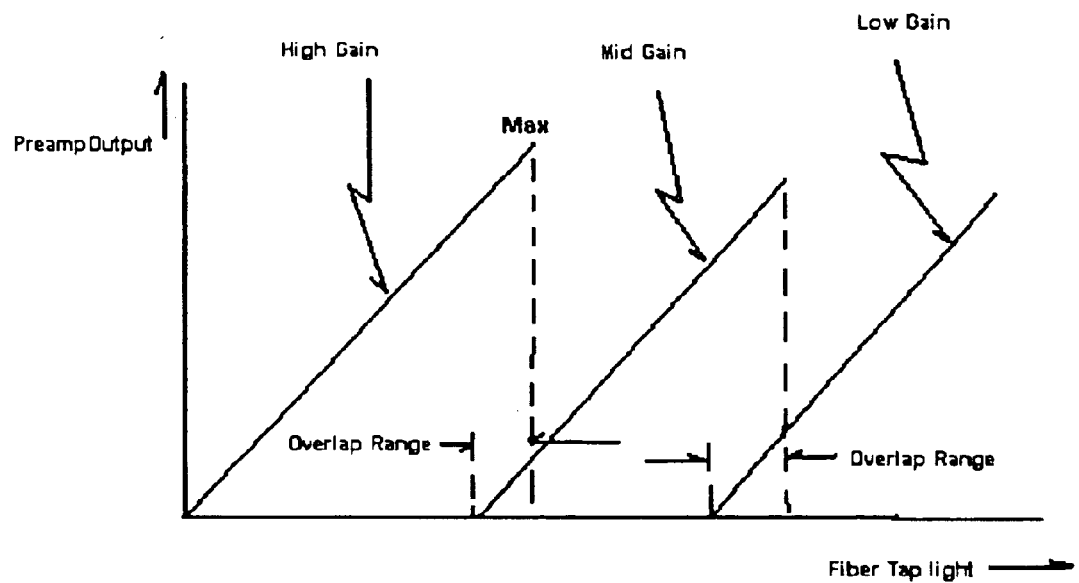
FIG. 23 shows three gain settings for the fiber tap preamplifier.

The light level in a particular input fiber from a source may vary over a wide range, e.g., from about −20 dbm to about +20 dbm. This represents a 10,000:1 ratio, so the preamp gains can be scaled. The gain of the preamp 1904 can be set to three different gains. These gain ranges should overlap so that as the signal starts to reach the edge of the preamp range, the preamp gain is switched. This is depicted in FIG. 23 where the vertical axis represents the output of the preamp 1904 and the horizontal axis represents the received detector output 1752. This scheme can be used to provide continuous monitoring of the tap amplitude over a wide dynamic range of light on the fiber. More gain ranges can be added to either improve the dynamic range, or to provide more overlap of the gain ranges.

A variable output amplitude (VOA) control may be implemented in the system shown in FIG. 17. The output fiber level can be set to a chosen amplitude, if the amplitude is less than the maximum light available at the output fiber. This is done by, e.g., spatially detuning the beam to fiber coupling at the output switch 1730 in the elevation axis. The VOA loop is closed by sampling the output fiber amplitude via the 10% tap output, which is done at a fixed rate. The fiber amplitude is compared to the desired level, and the reflector 1732 in the output switch 1730 is turned to either increase or decrease the beam coupling to the output collimator. The VOA loop may have at least two attack times to set the VOA amplitude, one used when initially making the fiber connection (switch time), the other being a slower time used when the VOS is in a steady-state condition. This second mode updates the Galvo Position with a very small angle for each update. The update information is derived after averaging several previous samples. Alternatively, the azimuth position of the beam 1712 or both elevation and azimuth positions may be adjusted to control the output power. If the system is instructed to set g the fiber output to a new level, the faster attack time is used to move the actuator to the new position until the correct fiber level is sensed. The slower mode based on averaging several samples is then followed.

Referring back to FIG. 18, each switch in the switching array has a monitor light source 1830, such as a diode laser, to produce the monitor beam 1832. Hence, a switching array with many switches can inevitably increase the power for driving the lasers 1830. To reduce the power consumption of the switching array, the lasers 1830 may be turned on and off periodically to reduce the power while each laser is turned on for a sufficient period for measuring the position of the reflector. For example, the driving currents to the lasers 1830 may be modulated by a square wave at roughly 20% duty cycle ON period. This low duty-cycle operation allows almost a saving in power dissipation by 5 times in operating the lasers 1830. The modulation frequency is chosen to be high enough that the PSD-Preamplifier combination acts as a low-pass filter to the laser beam. Therefore, the actuator control loop behaves as though the laser were operated in a DC mode.

Figure 25:
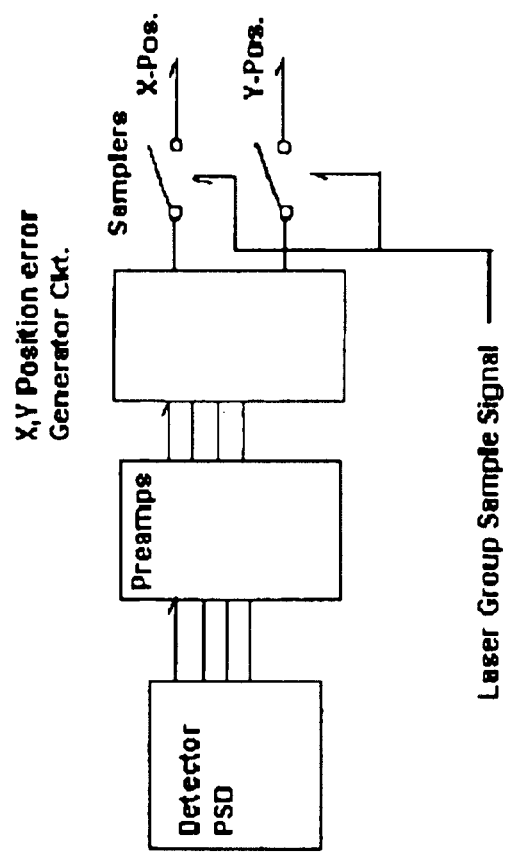
FIGS. 24 and 25 show one way of modulating the laser power levels of the lasers in the back of the 2D switching elements.
Figure 24:
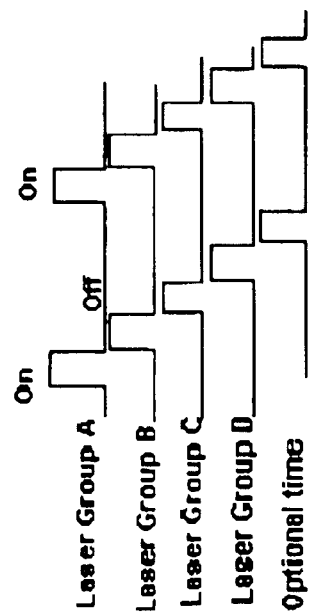

FIG. 24 shows the timing of modulation signals for modulating the lasers 1830 in different groups, and are time-division multiplexed in order to reduce the peak current requirement from the power supply. In this implementation, only 25% of the lasers are powered on at any one time while the remaining lasers are turned off. Different groups of lasers are operated at different phase relationships to each other. FIG. 25 shows that, the preamps for driving the lasers may be time-division multiplexed in phase with the appropriate lasers to operate the lasers at lower power, since the preamp is sampled only when the laser is on. The above pulse width modulation (PWM) technique for operating the lasers allows for longer laser lifetime because the junction temperature of the laser is much cooler. Alternatively, the sample switch may be eliminated.

Although only a few embodiments are disclosed, variations and enhancements may be made. For example, although the local and global optical sensing mechanisms are described with specific reference to non-blocking optical switching arrays, it is understood that such optical sensing mechanisms may be applied to any controllable switching arrays including blocking switching arrays. For another example, the optical position sensing mechanisms may be applicable to optical switching elements other than reflector switches as long as the switching mechanism can be controlled to vary the direction of a beam. These and other embodiments and variations are intended to be encompassed by the following claims.

What is claimed is:

1. An optical switch system, comprising:

an array of input optical ports each operable to receive a signal beam;

an array of first optical switch elements positioned to respectively receive light from said input optical ports, each first optical switch element having a first front reflector to receive and reflect said signal beam, a first back reflector fixed in position relative to said first front reflector to reflect a first local servo beam, a first optical position sensor to receive said first local servo beam and to produce a first position signal indicative of an orientation of said first front reflector, and a first actuator engaged to control an orientation of said first front reflector in response to said first position signal; an array of second optical switch elements positioned to receive light from said first optical switch elements, each second optical switch element operable to receive and reflect said signal beam reflected from any first optical switch element, wherein each second optical switch element includes a second front reflector to receive and reflect said signal beam, a second back reflector fixed in position relative to said second front reflector to reflect a second local servo beam, a second optical position sensor to receive said second local servo beam and to produce a second position signal indicative of an orientation of said second front reflector, and a second actuator engaged to control an orientation of said second front reflector in response to said second position signal;

an array of output optical ports positioned to respectively receive light from said second optical switch elements, said signal beam reflected from said second optical switch element at one output optical port;

a plurality of output optical detectors respectively coupled to said array of output optical ports, each output optical detector to receive a fraction of output optical power of a corresponding output optical port to produce an output detector signal having information about an alignment of incident light at said corresponding output optical port; and a switch control module coupled to receive output detector signals from said array of output optical detectors and to communicate with said first and said second optical switch elements, said switch control module responsive to a respective output detector signal and respective first and said second position signals to control orientations of respective first and second actuators in switching said signal beam from one input optical port to one output optical port.

2. The system as in claim 1, wherein each actuator is a galvanometer engaged to said front and said back reflectors.

3. The system as in claim 1, wherein said switch control module includes:

a set of first actuator control units to respectively control said first actuators and coupled to respectively receive said first position signals, wherein each first actuator control unit, a corresponding first actuator, and a corresponding first optical position sensor are coupled to form a feedback control loop to control said corresponding first actuator;

a set of second actuator control units to respectively control said second actuators and coupled to respectively receive said second position signals, wherein each second actuator control unit, a corresponding second actuator, and a corresponding second optical position sensor are coupled to form a feedback control loop to control said corresponding second actuator; and a controller coupled to receive said output detector signals and operable to produce a control signal to each of said first and said second actuator control units to set a corresponding actuator to a selected orientation.

4. The system as in claim 3, wherein each of said first and said second actuator control units includes:

a position circuit to extract an actual position of a corresponding actuator from a corresponding position signal generated by a corresponding optical position sensor;

a position error circuit coupled to said controller and said position circuit to determine an error in position from said control signal and said actual position; and a loop compensator circuit connected to said position error circuit to produce an actuator control signal that drives said corresponding actuator.

5. The system as in claim 3, wherein each of said first and said second optical switch elements includes a local laser to produce a corresponding local servo beam that is used by a corresponding optical position sensor to produce a corresponding position signal, and wherein said of said first and said second actuator control units includes a laser controller circuit to receive and process a portion of said corresponding position signal to produce a laser power signal, and a laser driver circuit to control said local laser to stabilize a power of said local servo beam in response to said laser power signal.

6. The system as in claim 5, wherein local lasers in said optical switch elements are modulated to lase in pulses, and wherein local lasers in one group of said optical switch elements are turned on and local lasers in another group of said optical switch elements are turned off at a given time.

7. The system as in claim 3, wherein said controller includes a digital processor.

8. The system as in claim 3, further comprising an electrical amplifier connected between each output optical detector and said controller to amplify a corresponding output detector signal with a variable gain.

9. The system as in claim 1, wherein each of said first and said second actuators has two different rotation axes and is operable to independently rotate around said two different rotation axes.

10. The system as in claim 1, wherein said first optical switch element includes a local laser to produce said first local servo beam, a beam splitter in an optical path between said local laser and said first back reflector to direct said local servo beam reflected from said first back reflector to said first optical position sensor.

11. The system as in claim 1, wherein said first front reflector and said first back reflector are parallel to each other and face opposite directions.

* * * * *